(12) United States Patent
Ikeda

(10) Patent No.: US 8,971,170 B2
(45) Date of Patent: Mar. 3, 2015

(54) WIRELESS COMMUNICATION APPARATUS AND WIRELESS COMMUNICATION METHOD

(75) Inventor: Katsuhiro Ikeda, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 133 days.

(21) Appl. No.: 13/462,019

(22) Filed: May 2, 2012

(65) Prior Publication Data

US 2012/0275291 A1 Nov. 1, 2012

Related U.S. Application Data

(63) Continuation of application No. PCT/JP2009/070781, filed on Dec. 11, 2009.

(51) Int. Cl.
*H04J 11/00* (2006.01)
*H04L 5/00* (2006.01)
*H04L 27/26* (2006.01)

(52) U.S. Cl.
CPC ............ *H04L 5/0007* (2013.01); *H04L 27/263* (2013.01); *H04L 27/2636* (2013.01)
USPC ........................................................ 370/210

(58) Field of Classification Search
CPC .......................... H04L 27/2636; H04L 27/263
USPC ........................................................ 370/210
See application file for complete search history.

(56) References Cited

U.S. PATENT DOCUMENTS

| 7,821,991 | B2 | 10/2010 | Iwai et al. | |
|---|---|---|---|---|
| 8,189,700 | B2 | 5/2012 | Maeda | |
| 2010/0135433 | A1* | 6/2010 | Maeda | 375/295 |
| 2010/0195479 | A1* | 8/2010 | Lipka et al. | 370/203 |
| 2010/0316041 | A1 | 12/2010 | Koyanagi | |
| 2011/0069694 | A1* | 3/2011 | Skyman et al. | 370/343 |

FOREIGN PATENT DOCUMENTS

| JP | 2007-531384 | 11/2007 |
|---|---|---|
| JP | 2009-77318 | 4/2009 |
| JP | 2009-171025 | 7/2009 |
| JP | 2009-239539 | 10/2009 |
| JP | 4431176 | 12/2009 |
| JP | 2010-136028 | 6/2010 |
| WO | 2005/107121 | 11/2005 |
| WO | 2007/091675 | 8/2007 |
| WO | 2008/047874 | 4/2008 |

OTHER PUBLICATIONS

Notice of Rejection dated Apr. 16, 2013, from corresponding Japanese Application No. 2011-545040.
International Search Report dated Jan. 12, 2010, from corresponding International Application No. PCT/JP2009/070781.
Mohamed Noune, et al. "A Novel Frequency-Domain Implementation of Tomlinson-Harashima Precoding for SC-FDMA" Vehicular Technology Conference, 2009. VTC Spring 2009. IEEE 69th, Apr. 26, 2009, pp. 1-5.

* cited by examiner

*Primary Examiner* — Huy D Vu
*Assistant Examiner* — Kevin Cunningham
(74) *Attorney, Agent, or Firm* — Katten Muchin Rosenman LLP

(57) ABSTRACT

By using a discrete Fourier transform equation that is used to transform N data values (N is an integer equal to or greater than one) to N transformation values, a wireless communication apparatus calculates three continuous transformation values from the N data values. Then, the wireless communication apparatus obtains a fixed change in the phase difference from the three calculated transformation values; multiplies the calculated transformation value by a twiddle factor that is obtained from the change in the phase difference; and calculates not-yet calculated transformation values.

6 Claims, 15 Drawing Sheets

FIG.13

| ZC SEQUENCE NUMBER u | TRANSFORMATION VALUE | | |
|---|---|---|---|
| | X'(0) | X'(1) | X'(2) |
| 1 | aa | bb | cc |
| 2 | dd | ee | ff |
| 3 | gg | hh | ii |
| ⋮ | ⋮ | ⋮ | ⋮ |
| N | xx | yy | zz |

WIRELESS COMMUNICATION APPARATUS AND WIRELESS COMMUNICATION METHOD

CROSS-REFERENCE TO RELATED APPLICATION

This application is a continuation of International Application No. PCT/JP2009/070781, filed on Dec. 11, 2009, the entire contents of which are incorporated herein by reference.

FIELD

The embodiments discussed herein are directed to a wireless communication apparatus and a wireless communication method.

BACKGROUND

At the 3rd Generation Partnership Project (3GPP), a standards organization for mobile communication, specifications for Evolved Universal Terrestrial Radio Access (E-UTRA) are currently being drawn up. These specifications are the standard for next-generation mobile communications. In E-UTRA, a single-carrier frequency-division multiple access (SC-FDMA) method will be used as an uplink wireless access method. The SC-FDMA method is a wireless access method for transmitting data values using a physical channel, such as a physical random access channel (PRACH).

A wireless communication apparatus that uses the SC-FDMA method performs a discrete Fourier transformation on N data values in the time domain to transform N data values into N discrete Fourier transformation values (hereinafter, referred to as "transformation values") in the frequency domain. Then, the wireless communication apparatus maps the N transformation values onto subcarriers and transmits, along a physical channel, such as a PRACH, to the outside, data values in the time domain, which is obtained by performing an inverse Fourier transformation process on the mapped transformation values.

Patent Literature 1: International Publication Pamphlet No. WO 2007/91675

However, with the conventional wireless communication apparatus that uses the SC-FDMA method described above, because all of the N discrete Fourier transformation values are calculated using a discrete Fourier transform equation, there is a problem in that the amount of computation becomes enormous when calculating discrete Fourier transformation values. Specifically, if N data values in the time domain are $x_{u,n_{cs}}(n)$ ($0 \leq n < N$), the wireless communication apparatus calculates all of the N transformation values $X(k)$ ($0 \leq k < N$) by using the discrete Fourier transform equation illustrated below:

$$X(k) = \sum_{n=0}^{N-1} X_{u,n_{cs}}(n) W_N^{nk} \quad (1)$$

where, $W_N$ illustrated in Equation (1) is defined by Equation (2) below:

$$W_M = e^{-j\frac{2\pi}{N}} \quad (2)$$

The number of times multiplications of real numbers performed by using Equation (1) above is given by $4N(N-1)$, which is an enormous number of times. For example, if a wireless transmission device transmits data values using a PRACH, because N=839, the number of times real number multiplications are performed using Equation (1) above is $4 \times 839 \times (839-1) = 2,812,328$, which is an enormous number of times.

SUMMARY

According to an aspect of an embodiment of the invention, a wireless communication apparatus includes a first transformation value calculating unit that calculates three transformation values continuous in a frequency domain from N data values (N is an integer equal to or greater than one) by using a discrete Fourier transform equation that is used to transform the N data values continuous in a time domain into N transformation values continuous in the frequency domain; a phase difference calculating unit that obtains a change in a phase difference, which is a fixed value, from the three transformation values calculated by the first transformation value calculating unit and that calculates, on the basis of the obtained change in the phase difference, the phase difference between a calculated transformation value and a not-yet calculated transformation value; a second transformation value calculating unit that sequentially calculates the not-yet calculated transformation value by multiplying the calculated transformation value by a twiddle factor that uses the phase difference calculated by the phase difference calculating unit as a rotation angle; and a transmitting unit that maps, onto subcarriers, the transformation values calculated by the first transformation value calculating unit and the transformation values calculated by the second transformation value calculating unit, that performs an inverse Fourier transformation process on the mapped transformation values, and that transmits the transformation values subjected to the inverse Fourier transformation process.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 13 is a schematic diagram illustrating an example of information stored in a transformation value storing unit.

DESCRIPTION OF EMBODIMENTS

Preferred embodiments of a wireless communication apparatus and a wireless communication method disclosed in the present invention will be described in detail below with reference to the accompanying drawings.

[a] First Embodiment

Figure 1:
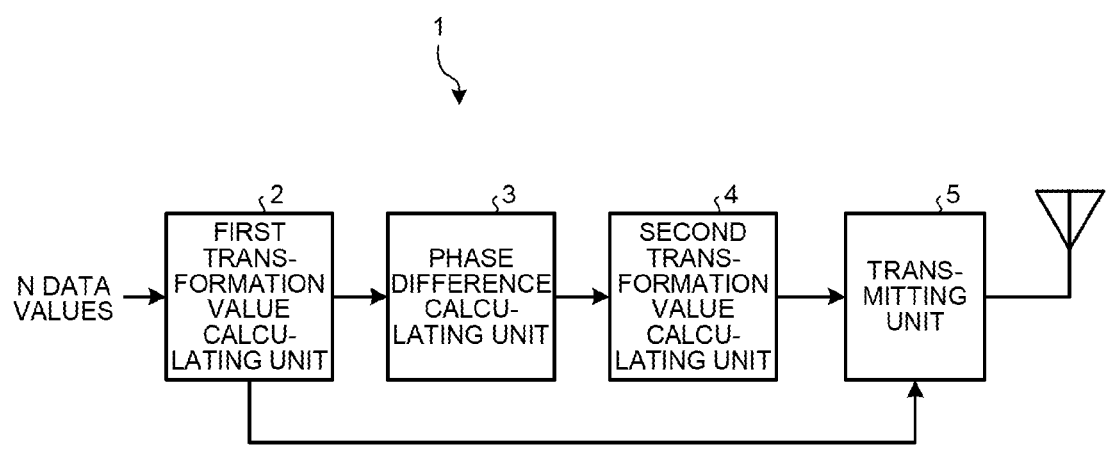
FIG. 1 is a block diagram illustrating the configuration of a wireless communication apparatus according to a first embodiment.

First, a wireless communication apparatus according to the first embodiment will be described. FIG. 1 is a block diagram illustrating the configuration of a wireless communication apparatus 1 according to a first embodiment. As illustrated in FIG. 1, the wireless communication apparatus 1 according to the first embodiment includes a first transformation value calculating unit 2, a phase difference calculating unit 3, a second transformation value calculating unit 4, and a transmitting unit 5.

The first transformation value calculating unit 2 calculates three transformation values from N data values continuous in the frequency domain by using a discrete Fourier transform equation to transform N data values (N is an integer equal to or greater than one) continuous in the time domain into N transformation values continuous in the frequency domain. The phase difference calculating unit 3 obtains a change in a phase difference, which is a fixed value, from the three transformation values calculated by the first transformation value calculating unit 2 and calculates, on the basis of the obtained change in the phase difference, the phase differences between a calculated transformation value and a not-yet calculated transformation value. The second transformation value calculating unit 4 sequentially calculates a not-yet calculated transformation value by multiplying the calculated transformation value by a twiddle factor, which uses the phase difference calculated by the phase difference calculating unit 3 as a rotation angle. The transmitting unit 5 maps, onto subcarriers, the transformation values calculated by the first transformation value calculating unit 2 and the transformation values calculated by the second transformation value calculating unit 4, performs an inverse Fourier transformation process on the mapped transformation values, and transmits the transformation values.

In this way, the wireless communication apparatus 1 according to the first embodiment calculates three continuous transformation values from N data values by using a discrete Fourier transform equation to transform the N data values into N transformation values. Then, the wireless communication apparatus 1 obtains the fixed change in the phase difference from the three calculated transformation values and calculates a not-yet calculated transformation value by multiplying a calculated transformation value by a twiddle factor obtained from the change in the phase difference. Specifically, the wireless communication apparatus 1 calculates three continuous transformation values from among the N transformation values by using a discrete Fourier transform equation. In contrast, the wireless communication apparatus 1 calculates the rest of the transformation values, other than the three already-calculated transformation values from among the N transformation values, by multiplying the calculated transformation values by a twiddle factor. Accordingly, the wireless communication apparatus 1 according to the first embodiment can reduce the amount of computation needed to calculate a discrete Fourier transformation values when compared with the conventional method in which all of the N transformation values are calculated by using a discrete Fourier transform equation.

[b] Second Embodiment

In the following, as a second embodiment, a specific example of the wireless communication apparatus 1 according to the first embodiment will be described. The wireless communication apparatus according to the second embodiment is a wireless communication apparatus, such as a mobile terminal device that uses a single-carrier frequency-division multiple access (SC-FDMA) method as an uplink wireless access method.

Figure 2:
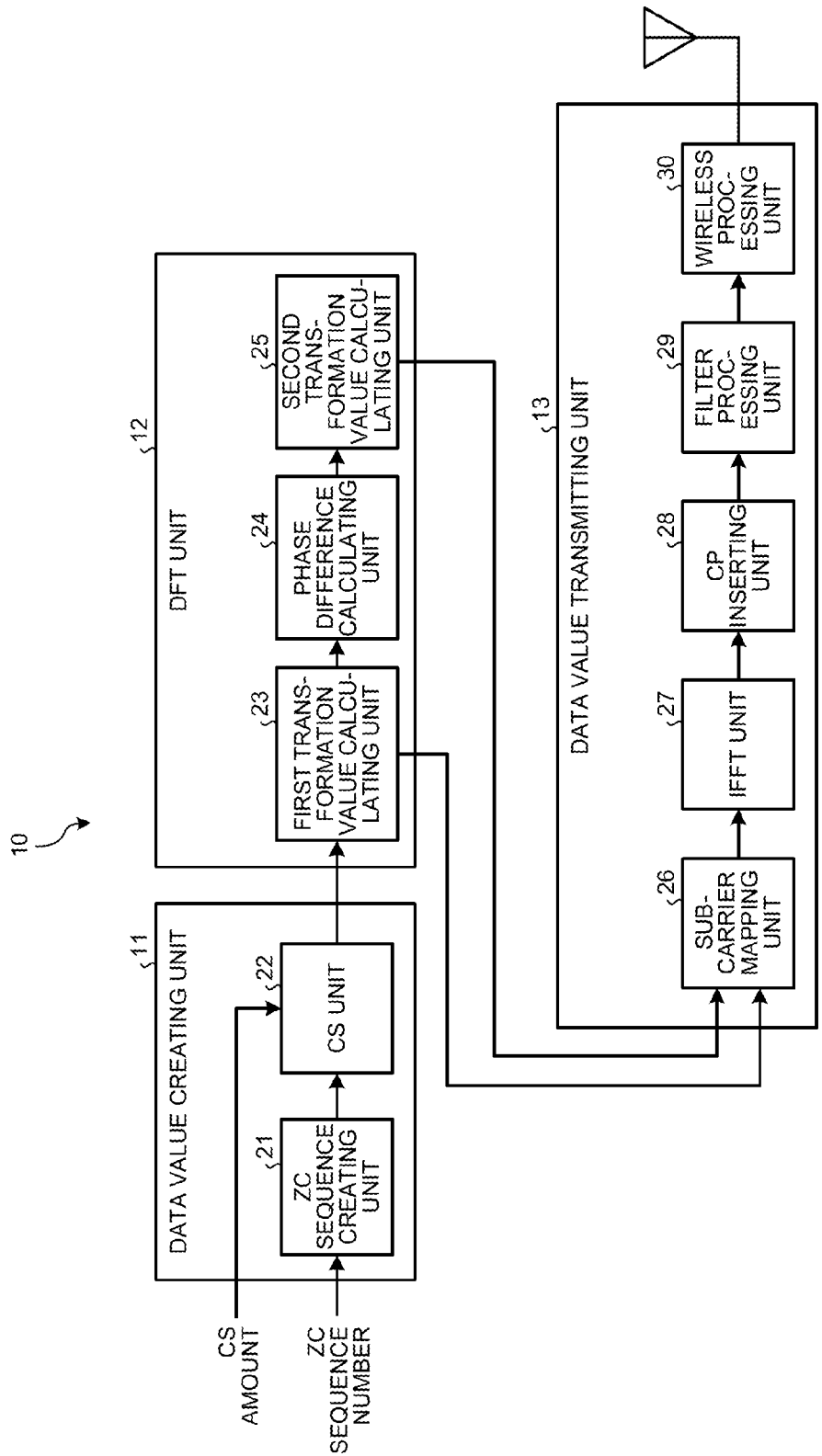
FIG. 2 is a block diagram illustrating the configuration of a wireless communication apparatus according to a second embodiment.

First, the wireless communication apparatus according to the second embodiment will be described. FIG. 2 is a block diagram illustrating the configuration of a wireless communication apparatus 10 according to a second embodiment. As illustrated in FIG. 2, the wireless communication apparatus 10 according to the second embodiment includes a data value creating unit 11, a DFT unit 12, and a data value transmitting unit 13.

The data value creating unit 11 creates N sequences (hereinafter, referred to as "data values") and outputs the created N data values to the DFT unit 12. Specifically, the data value creating unit 11 includes a Zadoff-Chu (ZC) sequence creating unit 21 and a cyclic shift (CS) unit 22.

The ZC sequence creating unit 21 creates a ZC sequence of N data values continuous in the time domain. Specifically, if a ZC sequence number is input from a higher layer that controls the wireless communication apparatus 10, the ZC sequence creating unit 21 creates, in accordance with the input ZC sequence number, a ZC sequence of N data values in the time domain. At this time, the ZC sequence $x_u(n)$ ($0 \leq n < N$) created by the ZC sequence creating unit 21 is represented by Equation (3) below:

$$x_u(n) = \exp\left[-j\frac{\pi \times u \times n \times (n+1)}{N}\right] \quad (3)$$

The CS unit 22 performs a cyclic shift on the N data values in the time domain that are input from the ZC sequence creating unit 21 and outputs the N data values subjected to the cyclic shift to the DFT unit 12. Specifically, if the amount of cyclic shift (hereinafter, referred to as the "CS amount") that is the number of data values subjected to the cyclic shift is input from the higher layer, the CS unit 22 performs the cyclic shift such that the sequence of the N data values is shifted in accordance with the input CS amount. Then, the CS unit 22 outputs the N data values subjected to the cyclic shift to the DFT unit 12. The N data values $x_{u,ncs}(n)$ ($0 \leq n < N$) subjected to the cyclic shift by the CS unit 22 is given by Equation (4) below:

$$x_{u,ncs}(n) = x_u((n+n_{cs}) \bmod N) \tag{4}$$

The DFT unit 12 transforms the N data values in the time domain that are input from the data value creating unit 11 into N discrete Fourier transformation values (hereinafter, simply referred to as "transformation values") in the frequency domain. Specifically, the DFT unit 12 includes a first transformation value calculating unit 23, a phase difference calculating unit 24, and a second transformation value calculating unit 25.

By using a discrete Fourier transform equation, which is an equation used to transform N data values that are input from the data value creating unit 11 into N transformation values, the first transformation value calculating unit 23 calculates continuous first to third transformation values from among the N data values. Specifically, by using the discrete Fourier transform equation that is Equation (1) described above, the first transformation value calculating unit 23 calculates, from among the N transformation values $X(k)$ ($0 \leq k < N$), the first to the third transformation values $X(0)$, $X(1)$, and $X(2)$.

Figure 3:
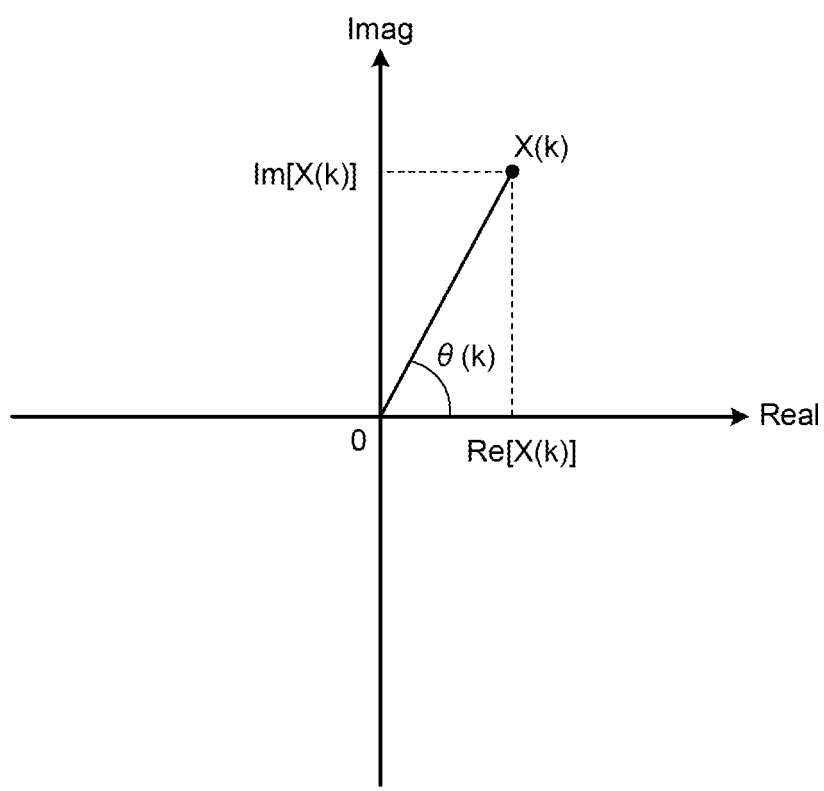
FIG. 3 is a schematic diagram illustrating a process performed by a phase difference calculating unit.

The phase difference calculating unit 24 obtains the change in the phase difference from the three transformation values calculated by the first transformation value calculating unit 23 and calculates, on the basis of the obtained change in the phase difference, the phase difference between a calculated transformation value and an arbitrary transformation value that appears among the fourth and the subsequent transformation values that have not been calculated. In the following, a specific example of a process performed by the phase difference calculating unit 24 will be described with reference to FIG. 3. FIG. 3 is a schematic diagram illustrating a process performed by the phase difference calculating unit 24.

First, the phase difference calculating unit 24 calculates the phases of the first to the third transformation values on the basis of the real number component and the imaginary number component of the first to the third transformation values calculated by the first transformation value calculating unit 23. In the example illustrated in FIG. 3, the phase difference calculating unit 24 calculates a phase $\theta(k)$ of the first to the third transformation values $X(k)$ on the basis of the real number component $Re[X(k)]$ and the imaginary number component $Im[X(k)]$ of the first to the third transformation values $X(k)$ ($0 \leq k \leq 2$). The phase $\theta(k)$ of the first to the third transformation values $X(k)$ ($0 \leq k \leq 2$) is represented by Equation (5) below:

$$\theta(k) = \arctan(Im[X(k)]/Re[X(k)]) \tag{5}$$

Subsequently, on the basis of the calculated phases of the first to the third transformation values, the phase difference calculating unit 24 calculates the phase difference between the first transformation value and the second transformation value and the phase difference between the second transformation value and the third transformation value. If $\theta(0)$, $\theta(1)$, and $\theta(2)$ represent the phases of the first to the third transformation values, respectively, a phase difference $d(0)$ between the first transformation value and the second transformation value and a phase difference $d(1)$ between the second transformation value and the third transformation value are represented by Equations (6) and (7) below:

$$d(0) = \theta(1) - \theta(0) \tag{6}$$

$$d(1) = \theta(2) - \theta(1) \tag{7}$$

Subsequently, on the basis of the calculated phase difference between the first transformation value and the second transformation value and the calculated phase difference between the second transformation value and the third transformation value, the phase difference calculating unit 24 calculates the change in the phase difference. The change in the phase difference calculated at this time is a fixed value.

If $d(0)$ represents the phase difference between the first transformation value and the second transformation value and $d(1)$ represents the phase difference between the second transformation value and the third transformation value, the change in the phase difference a is represented by Equation (8) below:

$$a = d(1) - d(0) \tag{8}$$

Subsequently, on the basis of the calculated change in the phase difference, the phase difference calculating unit 24 calculates the phase difference between a calculated transformation value and an arbitrary transformation value, from among the N transformation values, that appears among the fourth and the subsequent transformation values that have not been calculated. If the change in the phase difference is represented by a, the phase difference $d(k-1)$ between an arbitrary transformation value $X(k)$ ($3 \leq k < N$) that appears among the fourth and the subsequent transformation values and the transformation value $X(k-1)$ appearing immediately before the arbitrary transformation value is represented by Equation (9) below. At this time, the transformation value $X(k-1)$ appearing immediately before the arbitrary transformation value is assumed to be the calculated transformation value.

$$d(k-1) = d(k-2) + a \tag{9}$$

Figure 4:
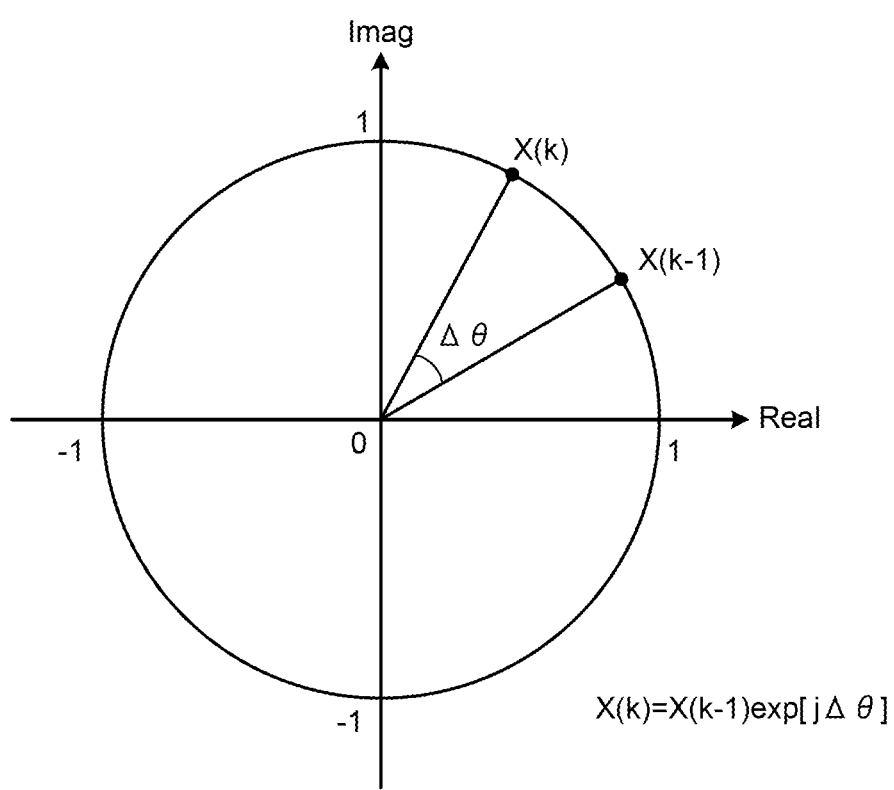
FIG. 4 is a schematic diagram illustrating a process performed by a second transformation value calculating unit.

A description will be given here by referring back to FIG. 2. By multiplying a calculated transformation value appearing immediately before an arbitrary transformation value that appears among the fourth and the subsequent transformation values by a twiddle factor, which uses the phase difference calculated by the phase difference calculating unit 24 as a rotation angle, the second transformation value calculating unit 25 sequentially calculates the fourth to the $N^{th}$ transformation values that have not been calculated. In the following, a process performed by the second transformation value calculating unit 25 will be specifically described with reference to FIG. 4. FIG. 4 is a schematic diagram illustrating a process performed by the second transformation value calculating unit 25.

The N transformation values are usually located on the unit circle in the complex plane. In the example illustrated in FIG. 4, from among the N transformation values, the arbitrary transformation value $X(k)$ ($3 \leq k < N$) that appears among the fourth and the subsequent transformation values and the calculated transformation value $X(k-1)$ appearing immediately before the arbitrary transformation value $X(k)$ are located on the unit circle in the complex plane. The phase difference $\Delta\theta$ indicates the phase difference between the transformation value $X(k)$ and the transformation value $X(k-1)$.

Under the condition illustrated in FIG. 4, by multiplying the transformation value $X(k-1)$ by a twiddle factor $\exp(j\Delta\theta)$, which uses the phase difference $\Delta\theta$ as the rotation angle, the second transformation value calculating unit 25 calculates the fourth to the $N^{th}$ transformation values $X(k)$ ($3 \leq k < N$) from among the N transformation values. Specifically, the fourth to the $N^{th}$ transformation values X(k) (3≤k<N) are obtained from Equation (10) below:

$$X(k)=X(k-1)\exp[j\Delta\theta] \quad (10)$$

The phase difference Δθ in Equation (10) above is the phase difference d(k−1), which is calculated by the phase difference calculating unit 24. Accordingly, if the phase difference Δθ in Equation (10) above is substituted for the phase difference d(k−1) in Equation (9), Equation (10) above is represented by Equation (11) below:

$$X(k)=X(k-1)\times\exp[j\times d(k-1)] \quad (11)$$

Specifically, when calculating the fourth transformation value X(3) from among the N transformation values, the second transformation value calculating unit 25 multiplies the third transformation value X(2), which is immediately before the fourth transformation value X(3), by a twiddle factor, which uses the phase difference d(2) calculated by the phase difference calculating unit 24 as the rotation angle. More specifically, by using Equation (11) above, the second transformation value calculating unit 25 performs the calculation below:

$$X(3) = X(2)\times\exp[j\times d(2)]$$
$$= X(2)\times\exp[j\times\{d(1)+a\}]$$

Furthermore, when calculating the fifth transformation value X(4) from among the N transformation values, the second transformation value calculating unit 25 multiplies the fourth transformation value X(3), which is immediately before the fifth transformation value X(4), by a twiddle factor, which uses the phase difference d(3) calculated by the phase difference calculating unit 24 as the rotation angle. Specifically, by using Equation (11) above, the second transformation value calculating unit 25 performs the calculation below:

$$X(4) = X(3)\times\exp[j\times d(3)]$$
$$= X(3)\times\exp[j\times\{d(1)+2a\}]$$

The second transformation value calculating unit 25 sequentially performs the calculation described above until it calculates the $N^{th}$ transformation value X(N−1). By doing so, the second transformation value calculating unit 25 sequentially calculates the fourth to the $N^{th}$ transformation values from among the N transformation values.

A description will be given here by referring back to FIG. 2. The data value transmitting unit 13 maps, onto subcarriers, the transformation values calculated by the first transformation value calculating unit 23 and the transformation values calculated by the second transformation value calculating unit 25; performs an inverse Fourier transformation process on the mapped transformation value; and transmits them. The data value transmitting unit 13 includes a sub-carrier mapping unit 26, an IFFT unit 27, a cyclic prefix (CP) inserting unit 28, a filter processing unit 29, and a wireless processing unit 30.

The sub-carrier mapping unit 26 maps, onto subcarriers, the transformation values calculated by the first transformation value calculating unit 23 and the transformation values calculated by the second transformation value calculating unit 25. By performing an inverse Fourier transformation process on the transformation values mapped by the sub-carrier mapping unit 26, the IFFT unit 27 transforms the transformation values in the frequency domain into data values in the time domain.

The CP inserting unit 28 defines the end of the data values received from the IFFT unit 27 as the CP and inserts the CP into the top of the data values. The filter processing unit 29 performs a filter process for smoothing the boundary between the data values that are input from the CP inserting unit 28 and outputs the data value subjected to the filter process to the wireless processing unit 30. The wireless processing unit 30 performs, on the data values input from the filter processing unit 29, a wireless process, such as digital to analog (D/A) conversion or up conversion, and transmits a signal subjected to the wireless process to the outside.

The data value creating unit 11, the DFT unit 12, and the data value transmitting unit 13 are electronic circuits. The ZC sequence creating unit 21 and the CS unit 22 are electronic circuits. The first transformation value calculating unit 23, the phase difference calculating unit 24, and the second transformation value calculating unit 25 are electronic circuits. The sub-carrier mapping unit 26, the IFFT unit 27, the CP inserting unit 28, the filter processing unit 29, and the wireless processing unit 30 are electronic circuits. Examples of the electronic circuits include an integrated circuit, such as an application specific integrated circuit (ASIC) or a field programmable gate array (FPGA), a central processing unit (CPU), or a micro processing unit (MPU).

Figure 5:
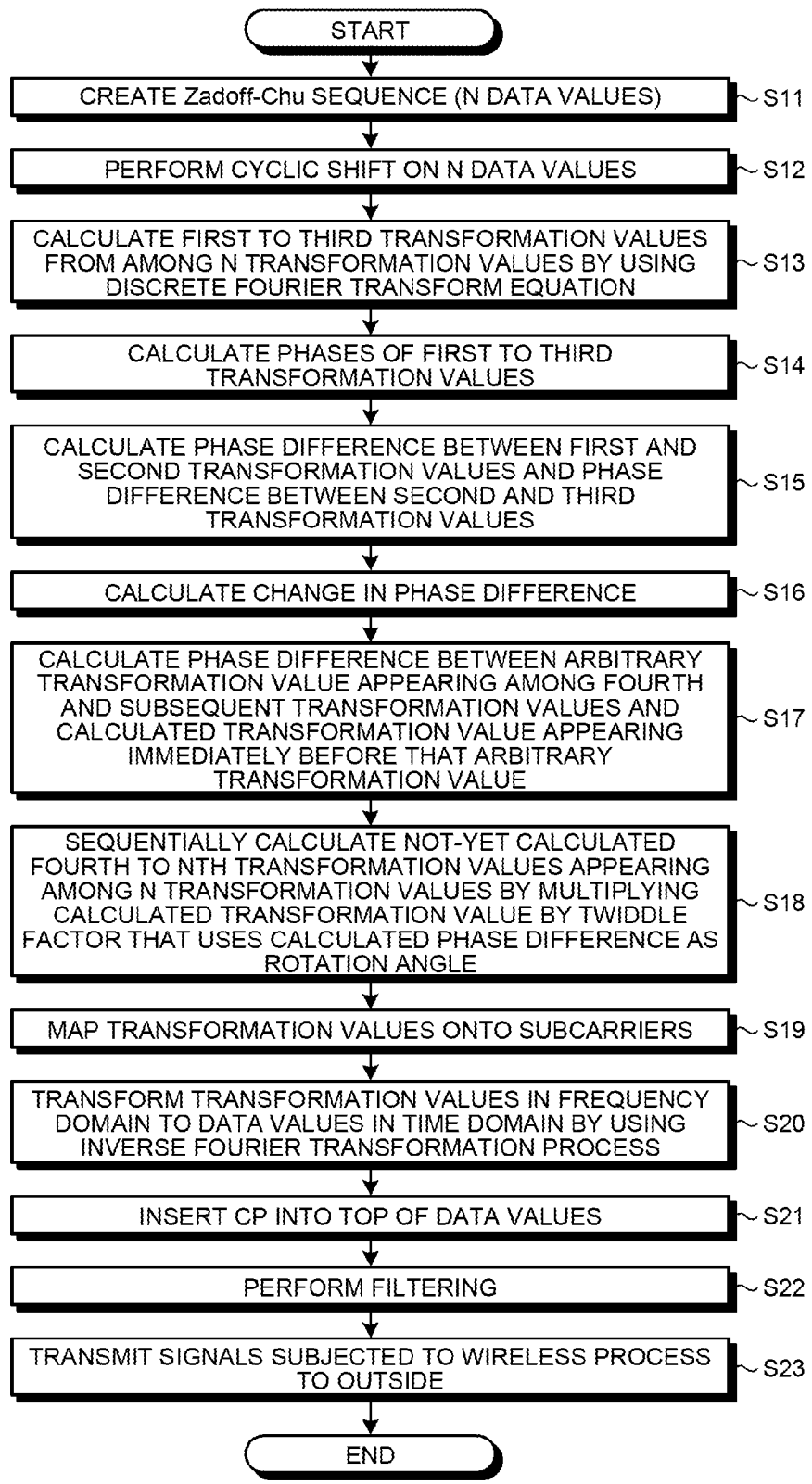
FIG. 5 is a flowchart illustrating the flow of a wireless communication process performed by the wireless communication apparatus according to the second embodiment.

In the following, a wireless communication process performed by the wireless communication apparatus 10 according to the second embodiment will be described. FIG. 5 is a flowchart illustrating the flow of a wireless communication process performed by the wireless communication apparatus 10 according to the second embodiment. As illustrated in FIG. 5, in the wireless communication apparatus 10 according to the second embodiment, the ZC sequence creating unit 21 in the data value creating unit 11 creates a ZC sequence that corresponds to N data values (Step S11). The CS unit 22 performs a cyclic shift on the N data values that are input from the ZC sequence creating unit 21 (Step S12). Then, the CS unit 22 outputs the N data values subjected to the cyclic shift to the DFT unit 12.

By using a discrete Fourier transform equation that is an equation used to transform the N data values that are input from the data value creating unit 11 to N transformation values, the first transformation value calculating unit 23 in the DFT unit 12 calculates the first to the third transformation values from among the N transformation values (Step S13).

On the basis of the real number component and the imaginary number component of the first to the third transformation values calculated by the first transformation value calculating unit 23, the phase difference calculating unit 24 calculates the phases of the first to the third transformation values (Step S14). Subsequently, on the basis of the calculated phases of the first to the third transformation values, the phase difference calculating unit 24 calculates the phase difference between the first transformation value and the second transformation value and the phase difference between the second transformation value and the third transformation value (Step S15). Then, on the basis of the calculated phase difference between the first transformation value and the second transformation value and the calculated phase difference between the second transformation value and the third transformation value, the phase difference calculating unit 24 calculates the change in the phase difference (Step S16). Then, on the basis of the calculated change in the phase difference, the phase difference calculating unit 24 calculates the phase difference between, from among the N transformation values, an arbitrary transformation value that appears among the fourth and the subsequent transformation values and a calculated transformation value appearing immediately before the arbitrary transformation value (Step S17).

By multiplying the calculated transformation value by a twiddle factor, which uses the phase difference calculated by the phase difference calculating unit 24 as a rotation angle, the second transformation value calculating unit 25 sequentially calculates, from among the N transformation values, the fourth to the $N^{th}$ transformation value that have not been calculated (Step S18).

Then, the sub-carrier mapping unit 26 in the data value transmitting unit 13 maps, onto subcarriers, the first to the third transformation values calculated by the first transformation value calculating unit 23 and the fourth to the $N^{th}$ transformation values calculated by the second transformation value calculating unit 25 (Step S19). The IFFT unit 27 transforms the transformation values in the frequency domain to data values in the time domain by performing an inverse Fourier transformation process on the transformation values mapped onto the subcarriers (Step S20). The CP inserting unit 28 defines the end of the data values that are input from the IFFT unit 27 as a CP and inserts the CP into the top of the data values (Step S21). The filter processing unit 29 performs a filter process for smoothing the boundary between the data values that are input from the CP inserting unit 28 and outputs the data value subjected to the filter process to the wireless processing unit 30 (Step S22). The wireless processing unit 30 performs, on the data values that are input from the filter processing unit 29, the wireless process, such as digital to analog conversion or up conversion, and transmits a signal subjected to the wireless process to the outside (Step S23).

As described above, by using a discrete Fourier transform equation to transform N data values to N transformation values, the wireless communication apparatus 10 according to the second embodiment calculates the first to the third transformation values from the N data values. Then, the wireless communication apparatus 10 obtains a fixed change in the phase difference from the calculated first to the third transformation values and sequentially calculates the fourth to the $N^{th}$ transformation values by multiplying a calculated transformation value appearing immediately before an arbitrary transformation value that appears among the fourth and the subsequent transformation values by a twiddle factor that is obtained from the change in the phase difference. Specifically, the wireless communication apparatus 10 calculates, from among the N transformation values, the first to the third transformation values by using a discrete Fourier transform equation, whereas, it calculates, from among the N transformation values, the fourth to the $N^{th}$ transformation values by multiplying the calculated transformation value by a twiddle factor. Accordingly, the wireless communication apparatus 10 according to the second embodiment can reduce the amount of computation needed to calculate discrete Fourier transformation values when compared with the conventional method in which all of the N transformation values are calculated by using a discrete Fourier transform equation.

Specifically, the number of times complex multiplications are needed to calculate the first to the third transformation values from among N transformation values by using a discrete Fourier transform equation is 2N times. Furthermore, the number of times complex multiplications are needed to calculate the fourth to the $N^{th}$ transformation values from among the N transformation values by multiplying the calculated transformation value by a twiddle factor is (N−3) times. If a complex multiplication is performed once, the number of times real number multiplications are performed is four. Accordingly, when calculating the N transformation values, the wireless communication apparatus 10 according to the second embodiment performs the real number multiplication for 4{2N+(N−3)}=12(N−1) times.

In contrast, in the conventional method for calculating all of the N transformation values by using a discrete Fourier transform equation, when calculating the N transformation values, the number of times real number multiplications are performed is 4N(N−1) times. Accordingly, when compared with the conventional method for calculating all of the N transformation values by using a discrete Fourier transform equation, the wireless communication apparatus according to the second embodiment can reduce the number of times real number multiplications are performed to 12(N−1)/{4N(N−1)}= 3/N. For example, if the wireless communication apparatus 10 transmits data values using a PRACH, because N=839, when compared with the conventional method, the wireless communication apparatus 10 can reduce the number of times real number multiplications are performed to 3/839=0.004.

[c] Third Embodiment

In the second embodiment described above, a description has been given of a case of performing the cyclic shift on N data values in the time domain and calculating N transformation values in the frequency domain from the N data values subjected to the cyclic shift. However, the cyclic shift may also be performed in the process for calculating the N transformation values in the frequency domain. Accordingly, in a third embodiment, a description will be given of a case of performing the cyclic shift in a process for calculating the N transformation values in the frequency domain.

Figure 6:
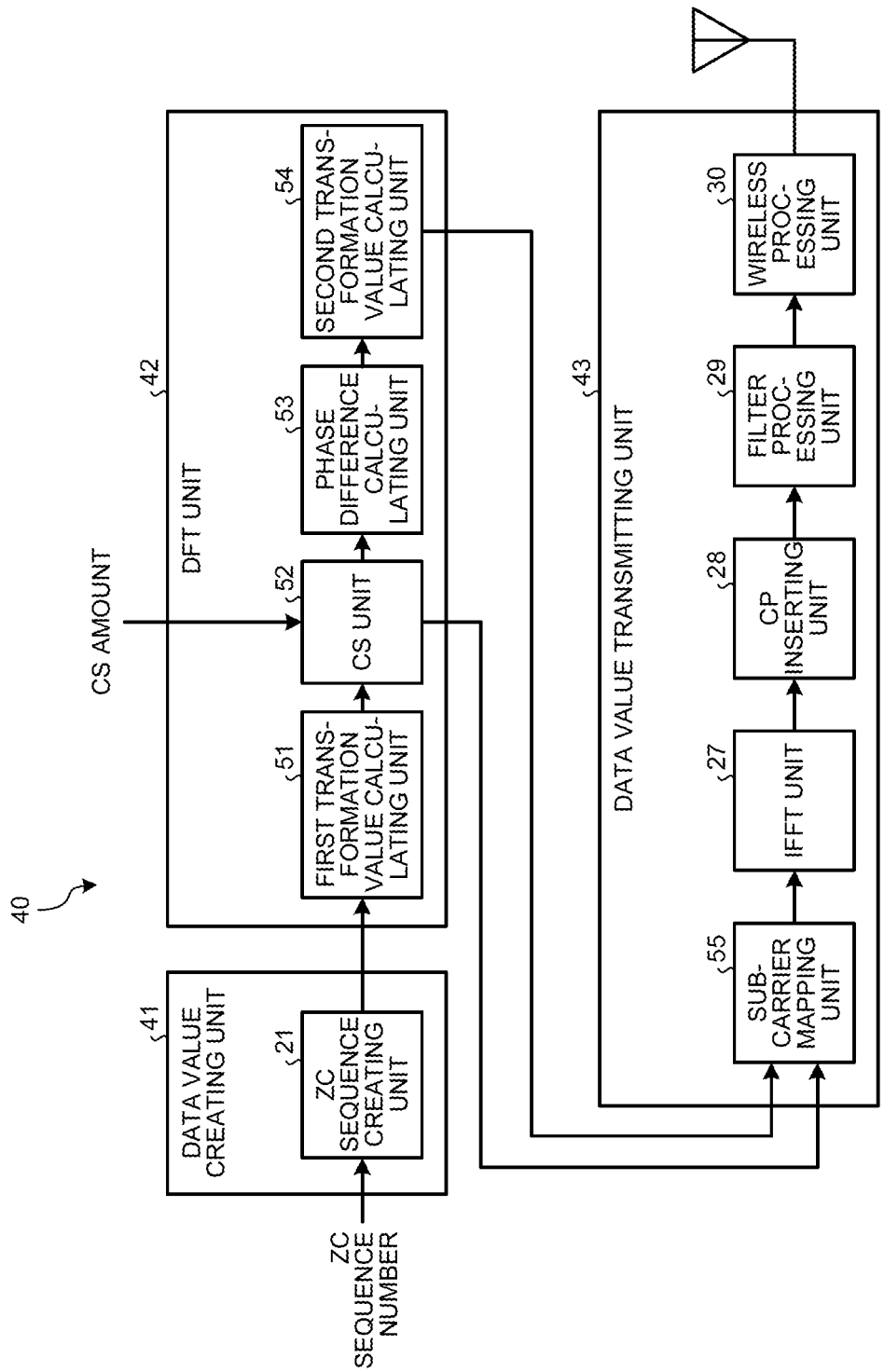
FIG. 6 is a block diagram illustrating the configuration of a wireless communication apparatus according to a third embodiment.

First, the configuration of a wireless communication apparatus 40 according to the third embodiment will be described. FIG. 6 is a block diagram illustrating the configuration of the wireless communication apparatus 40 according to a third embodiment. As illustrated in FIG. 6, the wireless communication apparatus 40 according to the third embodiment includes a data value creating unit 41, a DFT unit 42, and a data value transmitting unit 43. The data value creating unit 41 includes a ZC sequence creating unit 21. The ZC sequence creating unit 21 corresponds to the ZC sequence creating unit 21 illustrated in FIG. 2.

The DFT unit 42 transforms N data values in the time domain, which are input from the data value creating unit 41, into N transformation values in the frequency domain. The DFT unit 42 includes a first transformation value calculating unit 51, a CS unit 52, a phase difference calculating unit 53, and a second transformation value calculating unit 54.

Similarly to the first transformation value calculating unit 23 illustrated in FIG. 2, by using a discrete Fourier transform equation that is an equation used to transform the N data values that are input from the data value creating unit 41 to the N transformation values, the first transformation value calculating unit 51 calculates the first to the third transformation values from among the N transformation values. However, unlike the first transformation value calculating unit 23, the first transformation value calculating unit 51 calculates the first to third transformation values X'(0), X'(1), and X'(2) from among N transformation values X'(k) (0≤k<N) by using the discrete Fourier transform equation (12) below:

$$X'(k) = \sum_{n=0}^{N-1} X_u(n) W_N^{nk} \quad (12)$$

The symbol $x_u(n)$ in Equation (12) is Zadoff-Chu sequence $x_u(n)$ ($0 \le n < N$) indicated by Equation (3) above.

The CS unit 52 performs a cyclic shift on the first to the third transformation values calculated by the first transformation value calculating unit 51. Specifically, if a CS amount is input from a higher layer, the CS unit 52 performs the cyclic shift by shifting the sequence of the first to the third transformation values in accordance with the CS amount. The first to the third transformation values $X(k)$ ($0 \le k \le 2$) subjected to the cyclic shift by the CS unit 52 are represented by Equation (13) below:

$$X(k) = X'(k) \times \exp\left[j \times 2\pi \times \frac{n_{cs}}{N} \times k\right] \quad (13)$$

where $n_{cs}$ represents the CS amount.

By using the first to the third transformation values subjected to the cyclic shift by the CS unit 52, the phase difference calculating unit 53 calculates, from among the N transformation values, the phase difference between an arbitrary transformation value that appears among the fourth and the subsequent transformation values and a transformation value appearing immediately before the arbitrary transformation value. The specific process performed by the phase difference calculating unit 53 is the same as that performed by the phase difference calculating unit 24 according to the second embodiment.

By multiplying the transformation values that appears among the third and the subsequent transformation values by a twiddle factor, which uses the phase difference calculated by the phase difference calculating unit 53 as a rotation angle, the second transformation value calculating unit 54 calculates the fourth to the $N^{th}$ transformation values from among the N transformation values. The specific process performed by the second transformation value calculating unit 54 is the same as that performed by the second transformation value calculating unit 25 according to the second embodiment.

The data value transmitting unit 43 maps, onto subcarriers, the transformation value subjected to the cyclic shift by the CS unit 52 and the transformation values calculated by the second transformation value calculating unit 54 and transmits, to the outside, the data values obtained by performing an inverse Fourier transformation process on the mapped transformation values. The data value transmitting unit 43 includes a sub-carrier mapping unit 55, the IFFT unit 27, the CP inserting unit 28, the filter processing unit 29, and the wireless processing unit 30.

The IFFT unit 27, the CP inserting unit 28, the filter processing unit 29, and the wireless processing unit 30 correspond to the IFFT unit 27, the CP inserting unit 28, the filter processing unit 29, and the wireless processing unit 30, respectively, illustrated in FIG. 2. The sub-carrier mapping unit 55 maps, onto subcarriers, the transformation values subjected to the cyclic shift by the CS unit 52 and the transformation values calculated by the second transformation value calculating unit 54.

The data value creating unit 41, the DFT unit 42, and the data value transmitting unit 43 are electronic circuits. The first transformation value calculating unit 51, the CS unit 52, the phase difference calculating unit 53, and the second transformation value calculating unit 54 are electronic circuits. The sub-carrier mapping unit 55 is an electronic circuit. Examples of the electronic circuits include an integrated circuit, such as an ASIC or an FPGA, a CPU, and a MPU.

Figure 7:
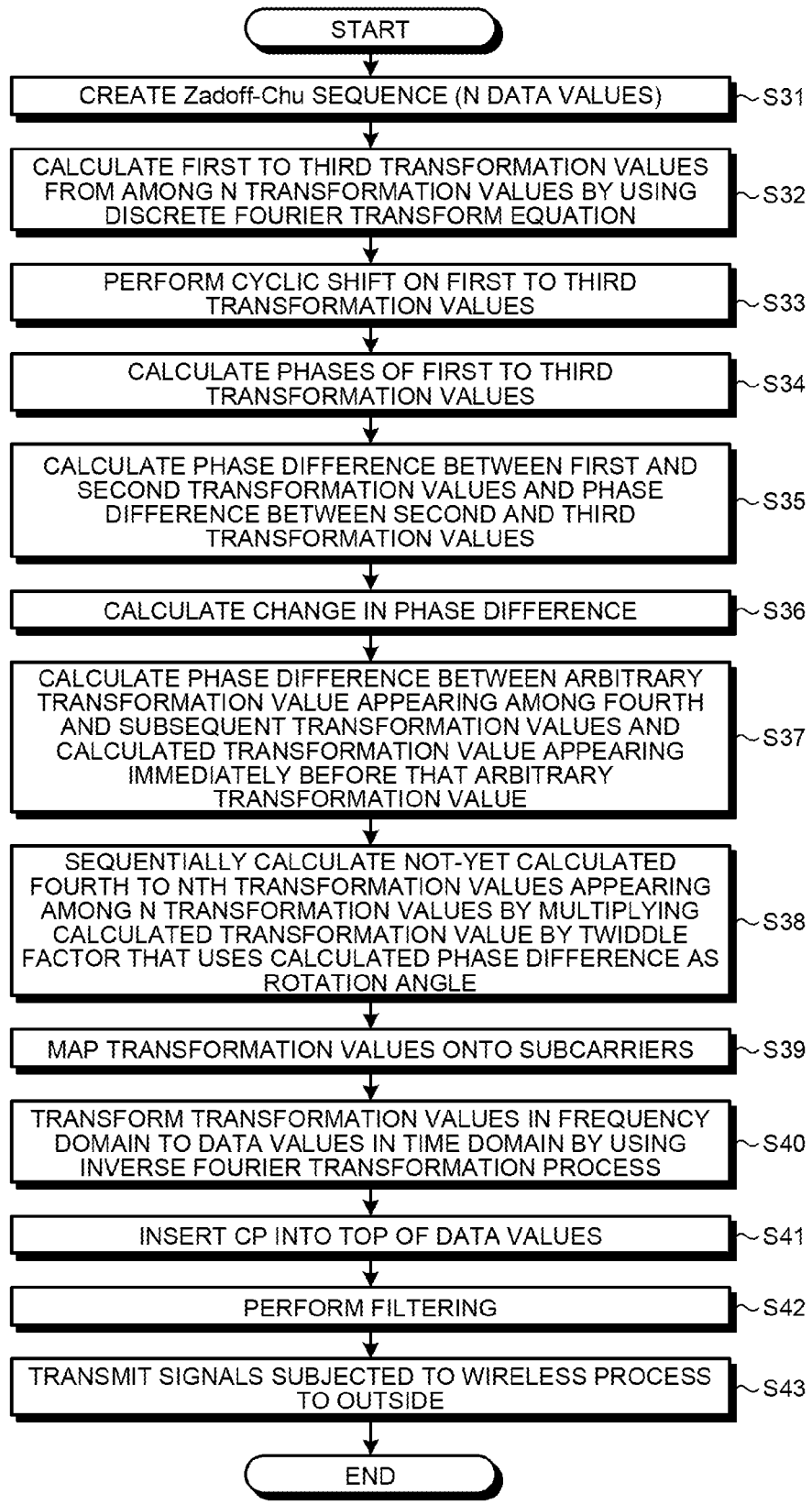
FIG. 7 is a flowchart illustrating the flow of a wireless communication process performed by the wireless communication apparatus according to the third embodiment.

In the following, the wireless communication process performed by the wireless communication apparatus 40 according to the third embodiment will be described. FIG. 7 is a flowchart illustrating the flow of a wireless communication process performed by the wireless communication apparatus 40 according to the third embodiment. Because Steps S31, S35 to S38, and S40 to S43 correspond to Steps S11, S15 to S18, and S20 to S23 described in the second embodiment, respectively, a simplified description thereof will be given. As illustrated in FIG. 7, with the wireless communication apparatus 40 according to the third embodiment, the ZC sequence creating unit 21 in the data value creating unit 41 creates a Zadoff-Chu sequence that corresponds to N data values (Step S31).

By using a discrete Fourier transform equation that is an equation used to transform the N data values received from the data value creating unit 41 to the N transformation values, the first transformation value calculating unit 51 in the DFT unit 42 calculates the first to the third transformation values from among the N transformation values (Step S32). The CS unit 52 performs the cyclic shift on the first to the third transformation values calculated by the first transformation value calculating unit 51 (Step S33).

The phase difference calculating unit 53 calculates the phases of the first to the third transformation value on the basis of the real number component and the imaginary number component of the first to the third transformation values subjected to the cyclic shift performed by the CS unit 52 (Step S34). Then, the phase difference calculating unit 53 calculates the phase difference between the first transformation value and the second transformation value and the phase difference between the second transformation value and the third transformation value (Step S35) and calculates the change in the phase difference (Step S36). Subsequently, the phase difference calculating unit 53 calculates, from among the N transformation values, the phase difference between an arbitrary transformation value that appears among the fourth and the subsequent transformation values and a calculated transformation value appearing immediately before the arbitrary transformation value (Step S37).

By multiplying a calculated transformation value by a twiddle factor, which uses the phase difference calculated by the phase difference calculating unit 53 as a rotation angle, the second transformation value calculating unit 54 sequentially calculates the fourth to the $N^{th}$ transformation values that have not been calculated from among the N transformation values (Step S38).

Then, the sub-carrier mapping unit 55 in the data value transmitting unit 43 maps, onto subcarriers, the first to the third transformation values subjected to the cyclic shift by the CS unit 52 and the fourth to the $N^{th}$ transformation value calculated by the second transformation value calculating unit 54 (Step S39). Subsequently, the IFFT unit 27 transforms the transformation values in the frequency domain to the data values in the time domain by using an inverse Fourier transformation process (Step S40) and the CP inserting unit 28 inserts the CP into the top of the data values (Step S41). Then, the filter processing unit 29 performs the filter process (Step S42) and the wireless processing unit 30 transmits a signal subjected to the wireless process to the outside (Step S43).

As described above, the wireless communication apparatus 40 according to the third embodiment performs a cyclic shift on the first to the third transformation values in the frequency domain calculated by using a discrete Fourier transform equation. Then, the wireless communication apparatus 40 obtains a fixed change in the phase difference from the first to the third transformation values subjected to the cyclic shift and multiplies a calculated transformation value, which appears immediately before an arbitrary transformation value that appears among the fourth and the subsequent transformation values, by a twiddle factor that is obtained from the change in the phase difference, and thereby the wireless communication apparatus 40 sequentially calculates the fourth to the $N^{th}$ transformation values. In other words, the wireless communication apparatus 40 performs a cyclic shift on the first to the third transformation values in the frequency domain during a process of calculating the N transformation values in the frequency domain. The number of times the cyclic shifts are performed is three. Accordingly, the wireless communication apparatus 40 according to the third embodiment can reduce the number of cyclic shifts from N times to 3 times when compared with a case in which N transformation values in the frequency domain are calculated from the N data values subjected to the cyclic shift.

[d] Fourth Embodiment

In the second embodiment, an example case has been described in which the fourth to the $N^{th}$ transformation values are sequentially calculated by multiplying a calculated transformation value by a twiddle factor, which uses, as a rotation angle, the phase difference between an arbitrary transformation value that appears among the fourth and the subsequent transformation values from among the N transformation values and the calculated transformation value appearing immediately before the arbitrary transformation value. However, the fourth to the $N^{th}$ transformation values may also be calculated by multiplying one of the calculated first to third transformation values by a twiddle factor that uses, as a rotation angle, the phase difference between an arbitrary transformation value that appears among the fourth and the subsequent N transformation values and one of the calculated first to third transformation values. Accordingly, in a fourth embodiment, a description will be given of a case in which the fourth to the $N^{th}$ transformation values are calculated by multiplying one of the calculated first to third transformation values by a twiddle factor that uses, as a rotation angle, the phase difference between an arbitrary transformation value that appears among the fourth and the subsequent N transformation values and the one of the calculated first to third transformation values.

Figure 8:
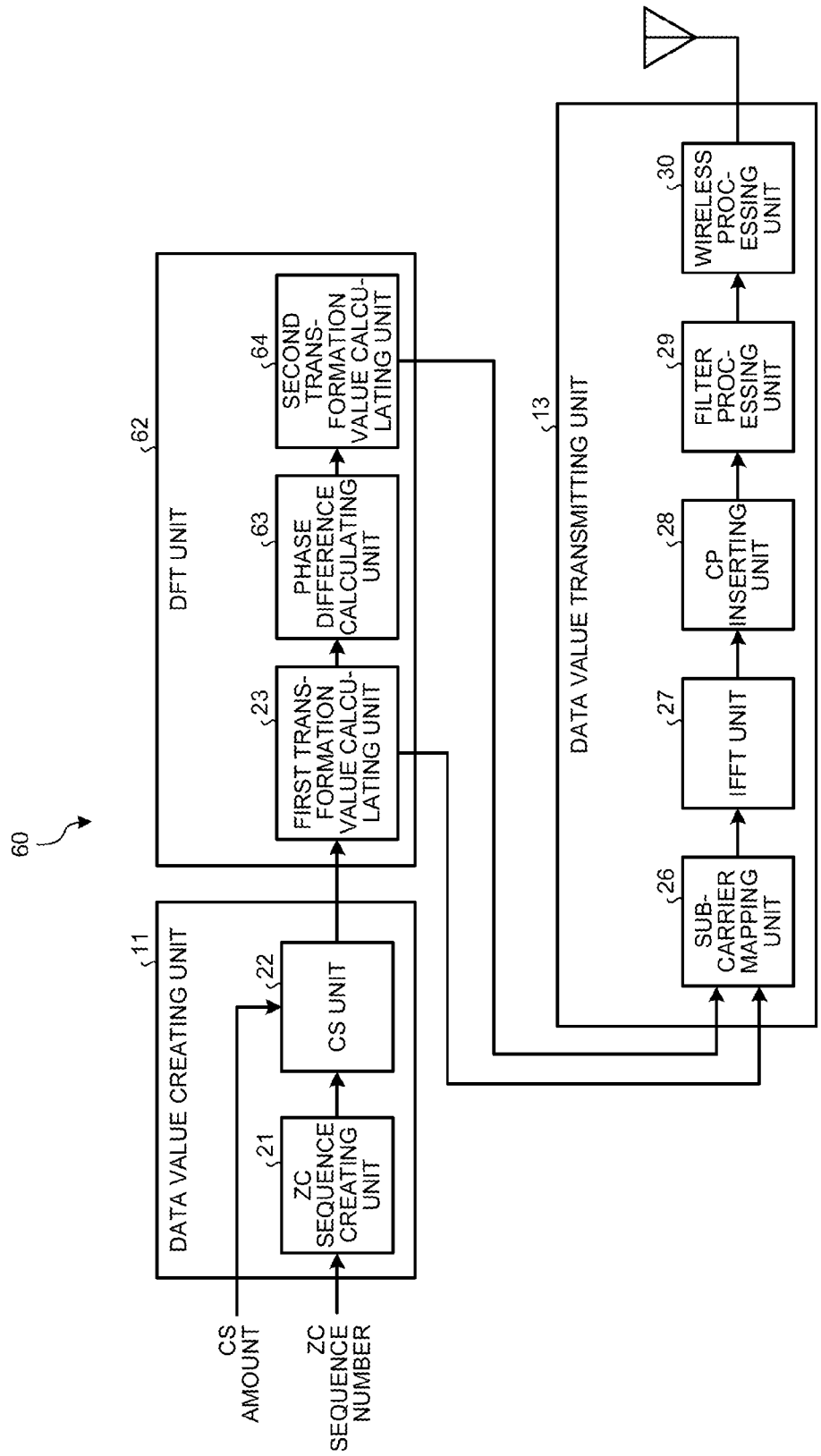
FIG. 8 is a block diagram illustrating the configuration of a wireless communication apparatus according to a fourth embodiment.

First, the configuration of a wireless communication apparatus 60 according to the fourth embodiment will be described. FIG. 8 is a block diagram illustrating the configuration of the wireless communication apparatus 60 according to a fourth embodiment. As illustrated in FIG. 8, the wireless communication apparatus 60 according to the fourth embodiment includes the data value creating unit 11, a DFT unit 62, and the data value transmitting unit 13. The data value creating unit 11 and the data value transmitting unit 13 correspond to the data value creating unit 11 and the data value transmitting unit 13 illustrated in FIG. 2, respectively.

The DFT unit 62 transforms N data values in the time domain that are input from the data value creating unit 11 into N transformation values in the frequency domain. The DFT unit 62 includes the first transformation value calculating unit 23, a phase difference calculating unit 63, and a second transformation value calculating unit 64. The first transformation value calculating unit 23 corresponds to the first transformation value calculating unit 23 illustrated in FIG. 2.

By using the transformation values calculated by the first transformation value calculating unit 23, the phase difference calculating unit 63 calculates the phase difference between an arbitrary transformation value that appears among the fourth and the subsequent N transformation values and one of the calculated first to the third transformation values. In this case, as an example, a description will be given of a case in which the phase difference is calculated between an arbitrary transformation value that appears among the fourth and the subsequent N transformation values and a calculated third transformation value. A process for calculating the phase difference between an arbitrary transformation value that appears among the fourth and the subsequent N transformation values and a calculated first or second transformation value is the same as the process for calculating the phase difference between an arbitrary transformation value that appears among the fourth and the subsequent N transformation values and a calculated third transformation value.

Specifically, first, on the basis of the real number component and the imaginary number component of the first to the third transformation values calculated by the first transformation value calculating unit 23, the phase difference calculating unit 63 calculates the phases of the first to the third transformation values. Then, on the basis of the calculated phases of the first to the third transformation values, the phase difference calculating unit 63 calculates the phase difference between the first transformation value and the second transformation value and the phase difference between the second transformation value and the third transformation value. Subsequently, on the basis of the calculated phase difference between the first transformation value and the second transformation value and the calculated phase difference between the second transformation value and the third transformation value, the phase difference calculating unit 63 calculates the change in the phase difference. The processes performed up to this step are the same as those performed by the phase difference calculating unit 24 according to the second embodiment.

Subsequently, on the basis of the change in the calculated phase difference, the phase difference calculating unit 63 calculates the phase difference between an arbitrary transformation value that appears among the fourth and the subsequent N transformation values and a third transformation value that is calculated by the first transformation value calculating unit 23. If a represents the change in the phase difference, the phase difference f(k) between an arbitrary transformation value X(k) (3≤k<N) that appears among the fourth and the subsequent N transformation values and the third transformation value X(2) is represented by Equation (14) below:

$$\begin{aligned} f(k) &= \theta(k) - \theta(2) \\ &= d(2) + d(3) + d(4) + \cdots + d(k-2) + d(k-1) \\ &= (d(1) + a) + (d(1) + 2a) + (d(1) + 3a) + \cdots + \\ &\quad (d(1) + (k-3)a) + (d(1) + (k-2)a) \\ &= (k-2)d(1) + \{1 + 2 + 3 + \cdots + (k-3) + (k-2)\}a \\ &= (k-2)d(1) + \frac{(k-1)(k-2)}{2}a \end{aligned} \quad (14)$$

By multiplying one of the first to the third transformation values that are calculated by the first transformation value calculating unit 23 by a twiddle factor that uses the phase difference calculated by the phase difference calculating unit 63 as a rotation angle, the second transformation value calculating unit 64 calculates the fourth to the $N^{th}$ transformation values that have not been calculated. In this case, as an example, a description will be given of a case in which the phase difference calculating unit 63 calculates the phase difference between an arbitrary transformation value that appears among the fourth and the subsequent N transformation values and the calculated third transformation value.

Specifically, by multiplying the third transformation value X(2) by a twiddle factor exp{j×f(k)} that uses the phase difference f(k), which is indicated by Equation (14), as a rotation angle, the second transformation value calculating unit 64 calculates the fourth to the Nth transformation values X(k) (3≤k<N) from among the N transformation values. In other words, the fourth to the $N^{th}$ transformation values X(k) (3≤k<N) are obtained using Equation (15) below:

$$X(k)=X(2)\times \exp[j\times f(k)] \quad (15)$$

If the phase difference between an arbitrary transformation value that appears among the fourth and the subsequent N transformation values and the first transformation value or the second transformation value, the second transformation value calculating unit multiplies the first transformation value or the second transformation value by a twiddle factor that uses the phase difference as a rotation angle.

The DFT unit 62 described above is an electronic circuit. Furthermore, the phase difference calculating unit 63 and the second transformation value calculating unit 64 are electronic circuits. Examples of the electronic circuit include an integrated circuit, such as an ASIC or a FPGA, a CPU, and a MPU.

Figure 9:
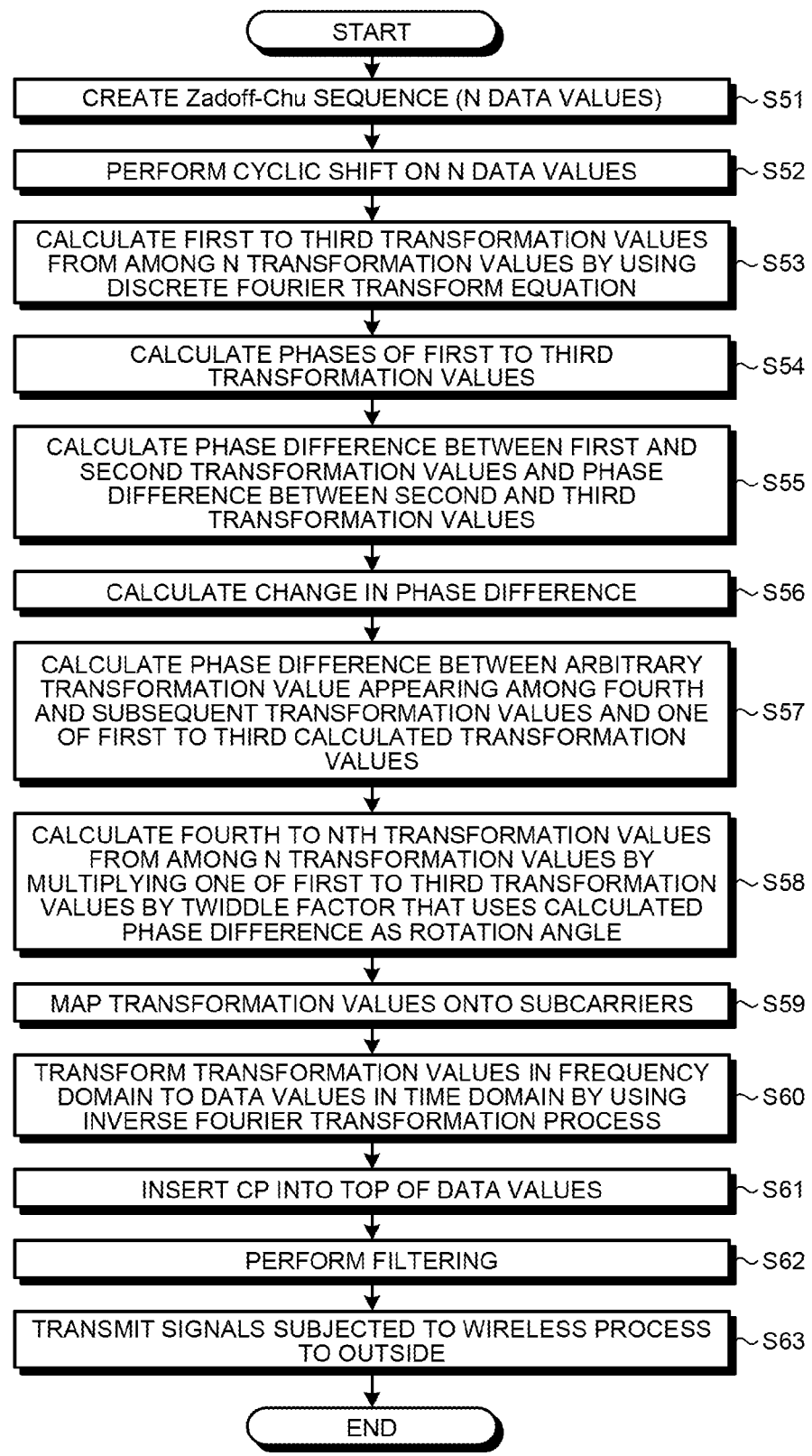
FIG. 9 is a flowchart illustrating the flow of a wireless communication process performed by the wireless communication apparatus according to the fourth embodiment.

In the following, a wireless communication process performed by the wireless communication apparatus 60 according to the fourth embodiment will be described. FIG. 9 is a flowchart illustrating the flow of a wireless communication process performed by the wireless communication apparatus 60 according to the fourth embodiment. Because the processes performed at Steps S51 to S56 and S59 to S63 correspond to the processes performed at Steps S11 to S16 and S19 to S23 in the second embodiment, a simplified description thereof will be given. As illustrated in FIG. 9, in the wireless communication apparatus 60 according to the fourth embodiment, the ZC sequence creating unit 21 in the data value creating unit 11 creates a Zadoff-Chu sequence that corresponds to N data values (Step S51) and the CS unit 22 performs a cyclic shift on the N data values (Step S52).

By using a discrete Fourier transform equation that is an equation used to transform N data values that are input from the data value creating unit 11 to the N transformation values, the first transformation value calculating unit 23 in the DFT unit 62 calculates the first to the third transformation values from among the N transformation values (Step S53).

On the bases of the real number component and the imaginary number component of the first to the third transformation values calculated by the first transformation value calculating unit 23, the phase difference calculating unit 63 calculates the phases of the first to the third transformation values (Step S54). Then, on the bases of the calculated phases of the first to the third transformation values, the phase difference calculating unit 63 calculates the phase difference between the first transformation value and the second transformation value and the phase difference between the second transformation value and the third transformation value (Step S55). Subsequently, on the basis of the calculated phase difference between the first transformation value and the second transformation value and the phase difference between the second transformation value and the third transformation value, the phase difference calculating unit 63 calculates the change in the phase difference (Step S56).

Then, on the basis of the calculated change in the phase difference, the phase difference calculating unit 63 calculates the phase difference between an arbitrary transformation value that appears among the fourth and the subsequent N transformation values and one of the first to the third transformation values calculated by the first transformation value calculating unit 23 (Step S57). For example, the phase difference calculating unit 63 calculates the phase difference between an arbitrary transformation value that appears among the fourth and the subsequent N transformation values and the third transformation value.

Then, by multiplying one of the first to the third transformation values by a twiddle factor that uses the phase difference calculated by the phase difference calculating unit 63 as a rotation angle, the second transformation value calculating unit 64 calculates the fourth to the $N^{th}$ transformation values from among the N transformation values (Step S58). For example, if the phase difference between an arbitrary transformation value that appears among the fourth and the subsequent transformation values and the third transformation value by the phase difference calculating unit 63, the second transformation value calculating unit 64 multiplies the third transformation value by a twiddle factor that uses the phase difference as a rotation angle in order to calculate the fourth to the $N^{th}$ transformation values.

Subsequently, the sub-carrier mapping unit 26 in the data value transmitting unit 13 maps, onto subcarriers, the first to the third transformation values calculated by the first transformation value calculating unit 23 and the fourth to the $N^{th}$ transformation values calculated by the second transformation value calculating unit 64 (Step S59). Then, the IFFT unit 27 transforms the transformation value in the frequency domain into the data value in the time domain by using the inverse Fourier transformation process (Step S60) and the CP inserting unit 28 inserts the CP into the top of the data values (Step S61). Then, the filter processing unit 29 performs the filter process (Step S62) and the wireless processing unit 30 transmits a signal subjected to the wireless process to the outside (Step S63).

As described above, the wireless communication apparatus 60 according to the fourth embodiment multiplies one of the first to the third transformation values by a twiddle factor that uses, as a rotation angle, the phase difference between an arbitrary transformation value that appears among the fourth and the subsequent N transformation values and the one of the first to the third transformation values, and thereby the wireless communication apparatus 60 calculates the fourth to the $N^{th}$ transformation values. Accordingly, the wireless communication apparatus 60 according to the fourth embodiment does not need to calculate the fourth to the $N^{th}$ transformation values in the order they appear, and thus it is possible to calculate the fourth to the $N^{th}$ transformation values in parallel. Therefore, with the wireless communication apparatus 60 according to the fourth embodiment, the calculation speed of discrete Fourier transformation values can be improved.

[e] Fifth Embodiment

In the fourth embodiment described above, an example has been described in which N data values in the time domain are subjected to a cyclic shift and N transformation values in the frequency domain are calculated from the N data values subjected to the cyclic shift. However, the cyclic shift may also be performed in the process of calculating the N transformation values in the frequency domain. Accordingly, in a fifth embodiment, an example of performing the cyclic shift in the process of calculating the N transformation values in the frequency domain.

Figure 10:
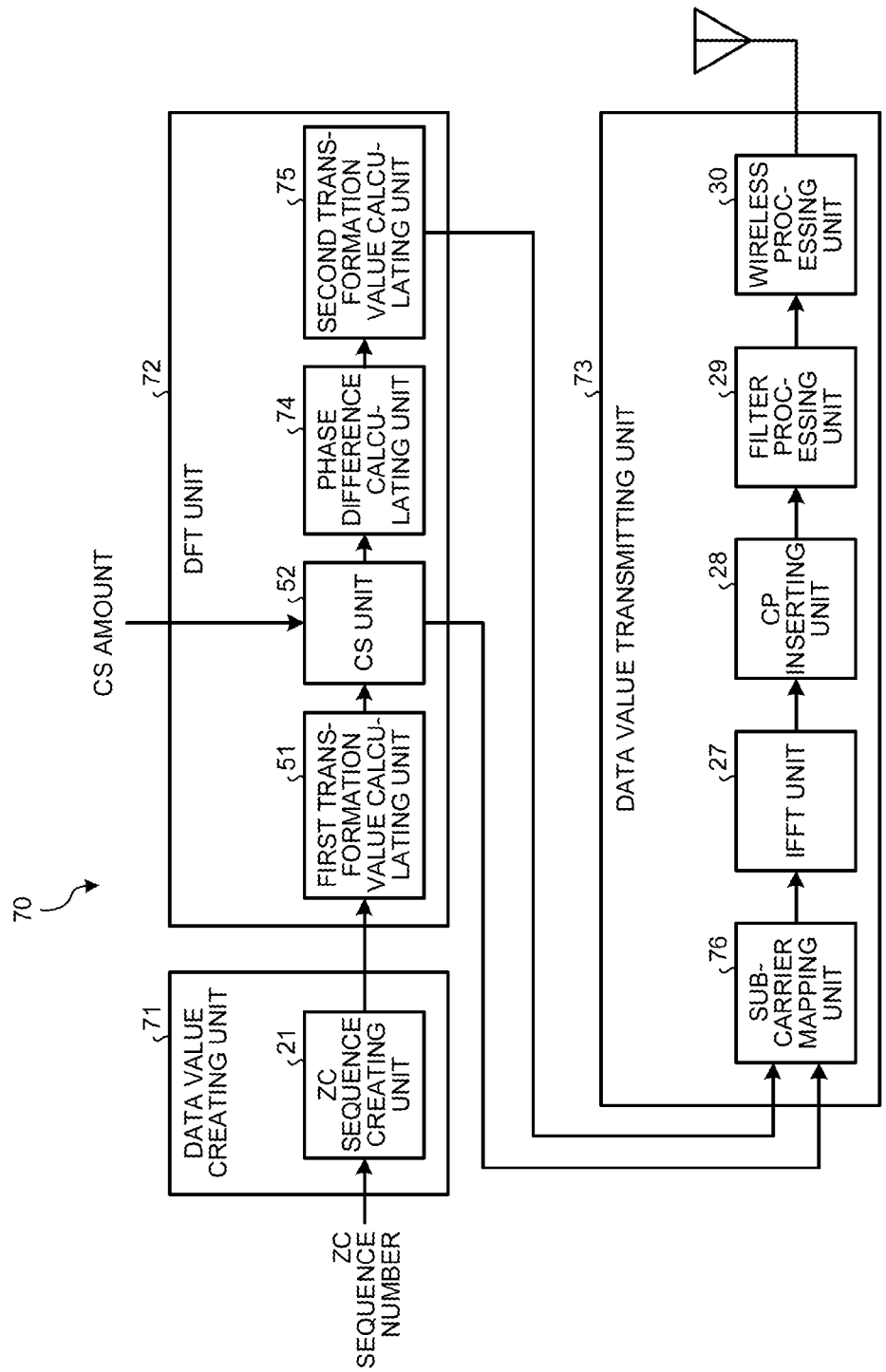
FIG. 10 is a block diagram illustrating the configuration of a wireless communication apparatus according to a fifth embodiment.

First, the configuration of a wireless communication apparatus 70 according to the fifth embodiment will be described. FIG. 10 is a block diagram illustrating the configuration of the wireless communication apparatus 70 according to a fifth embodiment. As illustrated in FIG. 10, the wireless communication apparatus 70 according to the fifth embodiment includes a data value creating unit 71, a DFT unit 72, and a data value transmitting unit 73. The data value creating unit 71 includes a ZC sequence creating unit 21. The ZC sequence creating unit 21 corresponds to the ZC sequence creating unit 21 illustrated in FIG. 6.

The DFT unit 72 transforms N data values in the time domain input from the data value creating unit 71 into N transformation values in the frequency domain. The DFT unit 72 includes the first transformation value calculating unit 51, the CS unit 52, a phase difference calculating unit 74, and a second transformation value calculating unit 75. The first transformation value calculating unit 51 and the CS unit 52 correspond to the first transformation value calculating unit 51 and the CS unit 52 illustrated in FIG. 6, respectively.

By using the first to the third transformation values subjected to the cyclic shift performed by the CS unit 52, the phase difference calculating unit 74 calculates the phase difference between an arbitrary transformation value that appears among the fourth and the subsequent N transformation values and one of the first to the third transformation values. The specific processes performed by the phase difference calculating unit 74 are the same as those performed by the phase difference calculating unit 63 according to the fourth embodiment.

By multiplying a transformation value that appears among the third and the subsequent N transformation values by a twiddle factor that uses the phase difference calculated by the phase difference calculating unit 74 as a rotation angle, the second transformation value calculating unit 75 calculates, from among the N transformation values, the fourth to $N^{th}$ transformation values. The specific processes performed by the second transformation value calculating unit 75 are the same as those performed by the second transformation value calculating unit 64 according to the fourth embodiment.

The data value transmitting unit 73 maps, onto subcarriers, the transformation value subjected to the cyclic shift by the CS unit 52 and the transformation value calculated by the second transformation value calculating unit 75 and transmits, to the outside, the data value obtained by performing the inverse Fourier transformation process on the mapped transformation value. The data value transmitting unit 73 includes a sub-carrier mapping unit 76, the IFFT unit 27, the CP inserting unit 28, the filter processing unit 29, and the wireless processing unit 30.

From among the above units, the IFFT unit 27, the CP inserting unit 28, the filter processing unit 29, and the wireless processing unit 30 correspond to the IFFT unit 27, the CP inserting unit 28, the filter processing unit 29, and the wireless processing unit 30 illustrated in FIG. 6, respectively. The sub-carrier mapping unit 76 maps, onto subcarriers, the transformation value subjected to the cyclic shift performed by the CS unit 52 and the transformation value calculated by the second transformation value calculating unit 75.

The data value creating unit 71, the DFT unit 72, and the data value transmitting unit 73 described above are electronic circuits. The phase difference calculating unit 74 and the second transformation value calculating unit 75 are electronic circuits. The sub-carrier mapping unit 76 is an electronic circuit. Examples of the electronic circuits include an integrated circuit, such as an ASIC or a FPGA, a CPU, and a MPU.

Figure 11:
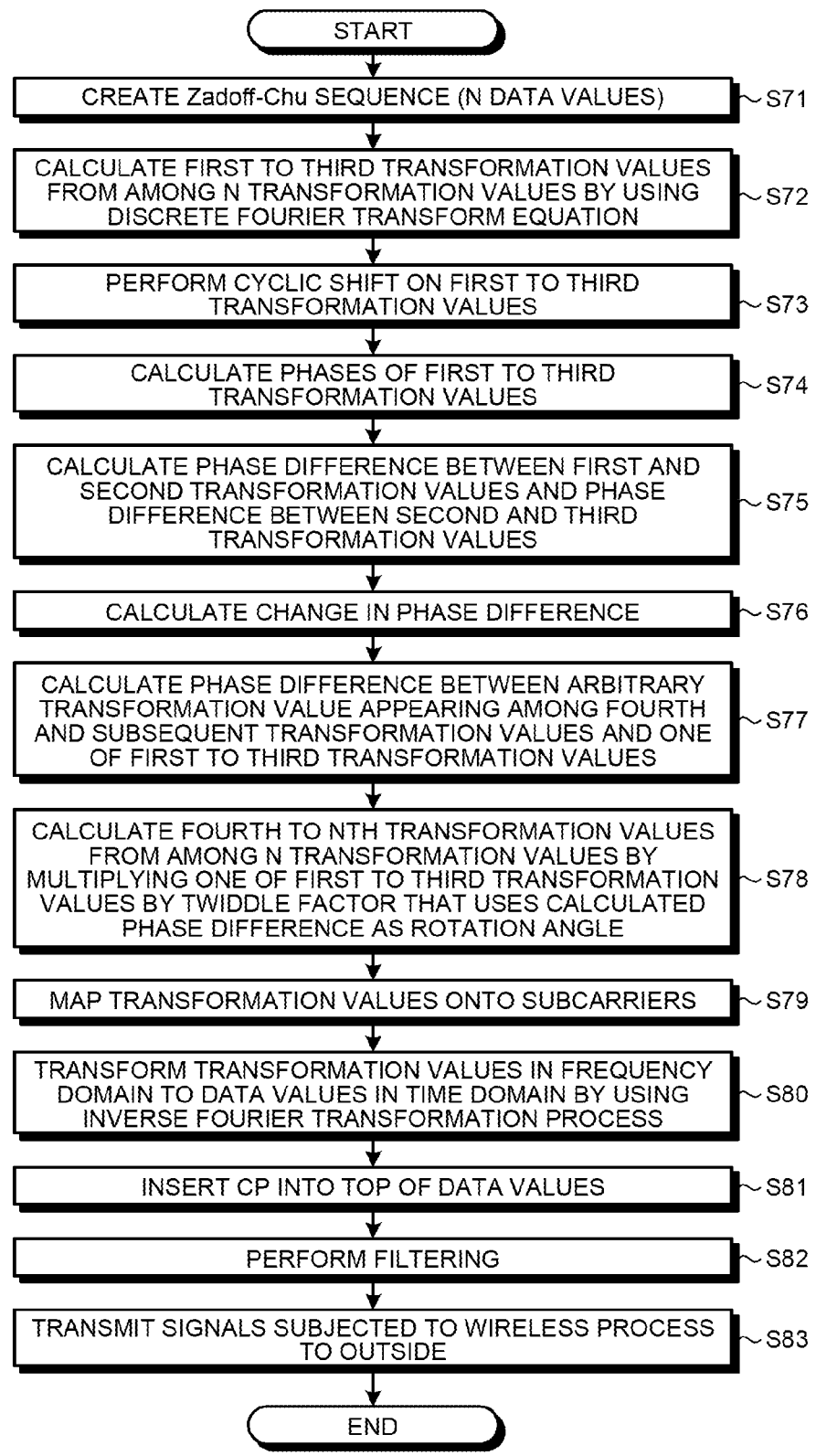
FIG. 11 is a flowchart illustrating the flow of a wireless communication process performed by the wireless communication apparatus according to the fifth embodiment.

In the following, the wireless communication process performed by the wireless communication apparatus 70 according to the fifth embodiment will be described. FIG. 11 is a flowchart illustrating the flow of a wireless communication process performed by the wireless communication apparatus 70 according to the fifth embodiment. Because the processes at Steps S71, S75 to S78, and S80 to S83 correspond to those at Steps S51, S55 to S58 and S60 to S63 in the fourth embodiment, a simplified description thereof will be given. As illustrated in FIG. 11, in the wireless communication apparatus 70 according to the fifth embodiment, the ZC sequence creating unit 21 in the data value creating unit 71 creates the Zadoff-Chu sequence that corresponds to the N data values (Step S71).

By using a discrete Fourier transform equation that is an equation used to transform N data values that are input from the data value creating unit 71 into the N transformation values, the first transformation value calculating unit 51 in the DFT unit 72 calculates the first to the third transformation values from among the N transformation values (Step S72). The CS unit 52 performs a cyclic shift on the first to the third transformation values calculated by the first transformation value calculating unit 51 (Step S73).

On the basis of the real number component and the imaginary number component of the first to the third transformation values subjected to the cyclic shift by the CS unit 52, the phase difference calculating unit 74 calculates the phases of the first to the third transformation values (Step S74). Then, the phase difference calculating unit 74 calculates the phase difference between the first transformation value and the second transformation value and the phase difference between the second transformation value and the third transformation value (Step S75) and calculates the change in the phase difference (Step S76). Subsequently, the phase difference calculating unit 74 calculates the phase difference between an arbitrary transformation value that appears among the fourth and the subsequent N transformation values and one of the first to the third transformation values (Step S77).

Then, by multiplying one of the first to the third transformation values by a twiddle factor that uses the phase difference calculated by the phase difference calculating unit 74 as a rotation angle, the second transformation value calculating unit 75 calculates the fourth to the $N^{th}$ transformation values from among the N transformation values (Step S78).

Subsequently, the sub-carrier mapping unit 76 in the data value transmitting unit 73 maps, onto subcarriers, the first to the third transformation values subjected to the cyclic shift performed by the CS unit 52 and the fourth to the $N^{th}$ transformation values calculated by the second transformation value calculating unit 75 (Step S79). Then, the IFFT unit 27 transforms the transformation values in the frequency domain into the data values in the time domain by using the inverse Fourier transformation process (Step S80) and the CP inserting unit 28 inserts the CP to the top of the data values (Step S81). Subsequently, the filter processing unit 29 performs the filter process (Step S82), and the wireless processing unit 30 transmits a signal subjected to the wireless process to the outside (Step S83).

As described above, the wireless communication apparatus 70 according to the fifth embodiment performs a cyclic shift on the first to the third transformation values in the frequency domain calculated by the discrete Fourier transform equation. Then, the wireless communication apparatus 70 calculates the fourth to the $N^{th}$ transformation value by obtaining, from the first to the third transformation values subjected to the cyclic shift, a fixed change in the phase difference and by multiplying one of the first to the third transformation values by a twiddle factor obtained from the change in the phase difference. Specifically, in the process of calculating the N transformation values in the frequency domain, the wireless communication apparatus 70 performs a cyclic shift on the first to the third transformation values in the frequency domain. The number of times cyclic shifts are performed at this stage is three. Accordingly, with the wireless communication apparatus 70 according to the third embodiment, the number of times cyclic shifts are performed can be reduced from N to three when compared with the method for calculating, from the N data values subjected to the cyclic shift, the N transformation values in the frequency domain.

[f] Sixth Embodiment

In the second to the fifth embodiments, examples have been given of a case in which N data values are created and then the first to the third transformation values from among the N transformation values are calculated by using a discrete Fourier transform equation. However, it may also possible to store, in a predetermined storing unit, the first to the third transformation values calculated by using a discrete Fourier transform equation by associating them with an arbitrary sequence number and to read, in accordance with an input sequence number, the transformation value stored in the storing unit. Accordingly, in a sixth embodiment, an example will be given of a case in which the first to the third transformation values to be calculated by using the discrete Fourier transform equation are stored in a predetermined storing unit by associating them with an arbitrary sequence number and are read in accordance with the input sequence number.

Figure 12:
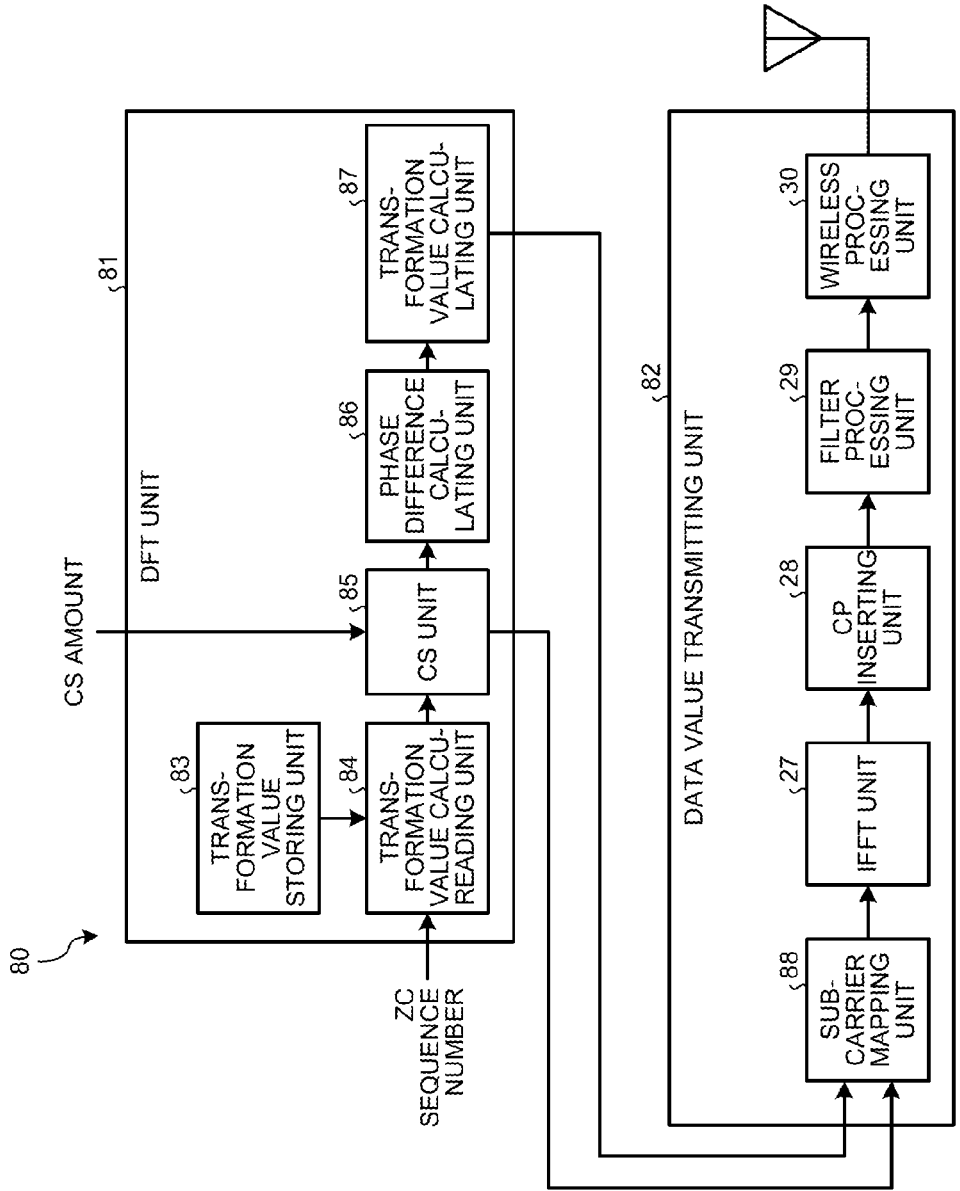
FIG. 12 is a block diagram illustrating the configuration of a wireless communication apparatus according to a sixth embodiment.

First, the configuration of the wireless communication apparatus according to the sixth embodiment will be described. FIG. 12 is a block diagram illustrating the configuration of a wireless communication apparatus 80 according to a sixth embodiment. As illustrated in FIG. 12, the wireless communication apparatus 80 according to the sixth embodiment includes a DFT unit 81 and a data value transmitting unit 82.

The DFT unit 81 transforms the N data values in the time domain into the N transformation values in the frequency domain. The DFT unit 81 includes a transformation value storing unit 83, a transformation value reading unit 84, a CS unit 85, a phase difference calculating unit 86, and a transformation value calculating unit 87.

From among the N transformation values calculated using a discrete Fourier transform equation that is an equation used to transform the N data values in the time domain into the N transformation values, the transformation value storing unit 83 stores the first to the third transformation values by associating them with an arbitrary sequence number. In the following, as an example, a description will be given of a case in which the transformation value storing unit 83 associates the first to the third transformation values with the ZC sequence number, from among the N transformation values calculated from the ZC sequence using the discrete Fourier transform equation, and stores the associated transformation values.

FIG. 13 is a schematic diagram illustrating an example of information stored in the transformation value storing unit 83. As illustrated in FIG. 13, from the ZC sequence $x_u(n)$ ($0 \le n < N$), the transformation value storing unit 83 associates, from among the N transformation values X' (k) ($0 \le k < N$) calculated using Equation (12), the first to the third transformation values X' (k) ($0 \le k \le 2$) with the ZC sequence number u.

The transformation value reading unit 84 reads, in accordance with the input sequence number, the first to the third transformation values stored in the transformation value storing unit 83. Specifically, the transformation value reading unit 84 reads, in accordance with the ZC sequence number u that is input from a higher layer, the first to the third transformation values X' (k) ($0 \le k \le 2$) stored in the transformation value storing unit 83.

The CS unit 85 performs the cyclic shift on the first to the third transformation values that are read by the transformation value reading unit 84. Specifically, if a CS amount is input from a higher layer, the CS unit 85 performs a cyclic shift by shifting the sequence of the first to the third transformation values in accordance with the input CS amount. At this time, the first to the third transformation values X(k) ($0 \le k \le 2$) subjected to the cyclic shift by the CS unit 85 are represented by Equation (13) above.

By using the first to the third transformation values subjected to the cyclic shift by the CS unit 85, the phase difference calculating unit 86 calculates the phase difference between an arbitrary transformation value that appears among the fourth and the subsequent N transformation values and a transformation value appearing immediately before the arbitrary transformation value. The specific process performed by the phase difference calculating unit 86 is the same as that performed by the phase difference calculating unit 24 according to the second embodiment.

By multiplying the third and the subsequent transformation value by a twiddle factor that uses the phase difference calculated by the phase difference calculating unit 86 as a rotation angle, the transformation value calculating unit 87 calculates the fourth to the $N^{th}$ transformation values from among the N transformation values. The specific process performed by the transformation value calculating unit 87 is the same as that performed by the second transformation value calculating unit 25 according to the second embodiment.

The data value transmitting unit 82 maps, onto subcarrier, the transformation values subjected to the cyclic shift performed by the CS unit 85 and the transformation values calculated by the transformation value calculating unit 87 and transmits, to the outside, the data value obtained by performing the inverse Fourier transformation process on the mapped transformation values. The data value transmitting unit 82 includes a sub-carrier mapping unit 88, the IFFT unit 27, the CP inserting unit 28, the filter processing unit 29, and the wireless processing unit 30.

From among the units described above, the IFFT unit 27, the CP inserting unit 28, the filter processing unit 29, and the wireless processing unit 30 correspond to the IFFT unit 27, the CP inserting unit 28, the filter processing unit 29, and the wireless processing unit 30 illustrated in FIG. 2, respectively. The sub-carrier mapping unit 88 maps, onto subcarriers, the transformation values subjected to the cyclic shift performed by the CS unit 85 and the transformation value calculated by the transformation value calculating unit 87.

The DFT unit 81 and the data value transmitting unit 82 described above are electronic circuits. The transformation value reading unit 84, the CS unit 85, the phase difference calculating unit 86, and the transformation value calculating unit 87 are electronic circuits. The sub-carrier mapping unit 88 is an electronic circuit. Examples of the electronic circuit include an integrated circuit, such as an ASIC or a FPGA, a CPU, or a MPU.

The transformation value storing unit 83 is a semiconductor memory device, such as a random access memory (RAM), a read only memory (ROM), and a flash memory, or a storage device, such as a hard disk and an optical disk.

Figure 14:
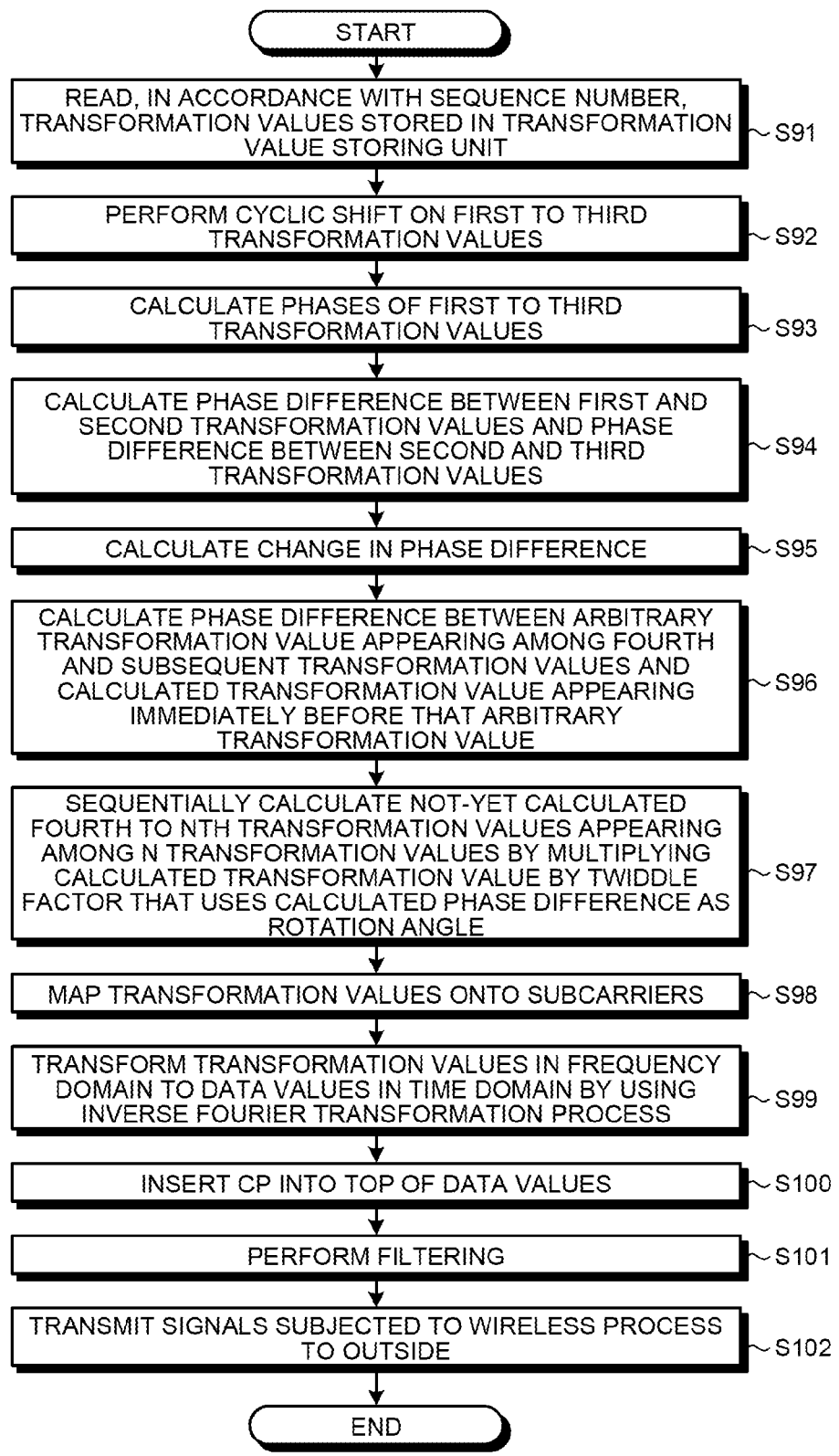
FIG. 14 is a flowchart illustrating the flow of a wireless communication process performed by the wireless communication apparatus according to the sixth embodiment.

In the following, the wireless communication process performed by the wireless communication apparatus 80 according to the sixth embodiment will be described. FIG. 14 is a flowchart illustrating the flow of a wireless communication process performed by the wireless communication apparatus 80 according to the sixth embodiment. As illustrated in FIG. 14, in the wireless communication apparatus 80 according to the sixth embodiment, the transformation value reading unit 84 in the DFT unit 81 reads, in accordance with an input sequence number, the first to the third transformation values stored in the transformation value storing unit 83 (Step S91). The CS unit 85 performs a cyclic shift on the first to the third transformation values that are read by the transformation value reading unit 84 (Step S92).

On the basis of the real number component and the imaginary number component of the first to the third transformation values subjected to the cyclic shift by the CS unit 85, the phase difference calculating unit 86 calculates the phases of the first to the third transformation values (Step S93). Then, the phase difference calculating unit 86 calculates the phase difference between the first transformation value and the second transformation value and the phase difference between the second transformation value and the third transformation value (Step S94) and calculates the change in the phase difference (Step S95). Subsequently, the phase difference calculating unit 86 calculates the phase difference between an arbitrary transformation value that appears among the fourth and the subsequent N transformation values and the calculated transformation value appearing immediately before the arbitrary transformation value (Step S96).

By multiplying the calculated transformation value by a twiddle factor that uses the phase difference calculated by the phase difference calculating unit 86 as a rotation angle, the transformation value calculating unit 87 sequentially calculates the fourth to the $N^{th}$ transformation values that have not been calculated from among the N transformation value (Step S97).

Then, the sub-carrier mapping unit 88 in the data value transmitting unit 82 maps, onto subcarriers, the first to the third transformation values subjected to the cyclic shift by the CS unit 85 and the fourth to the $N^{th}$ transformation values calculated by the transformation value calculating unit 87 (Step S98). Subsequently, the IFFT unit 27 transforms the transformation values in the frequency domain into the data values in the time domain using the inverse Fourier transformation process (Step S99). The CP inserting unit 28 inserts the CP into the top of the data values (Step S100). Then, the filter processing unit 29 performs the filter process (Step S101) and the wireless processing unit 30 transmits a signal subjected to the wireless process to the outside (Step S102).

As described above, the wireless communication apparatus 80 according to the sixth embodiment stores in advance, in a predetermined storing unit, the first to the third transformation values that are calculated using the discrete Fourier transform equation by associating them with an arbitrary sequence number and reads, in accordance with the input sequence number, the transformation values stored in the storing unit. Accordingly, the wireless communication apparatus 80 according to the sixth embodiment can reduce the processes for calculating the first to the third transformation values from among the N transformation values by using the discrete Fourier transform equation and further reduce the amount of computation needed to calculate discrete Fourier transformation values.

[g] Seventh Embodiment

In the above explanation, the embodiments of the present invention have been described; however, the present invention can be implemented with various kinds of embodiments other than the embodiments described above. Therefore, in the following, another embodiment included in the present invention will be described.

(1) Wireless Access Method

In the second to the sixth embodiments, the wireless communication apparatus disclosed in the present invention is used in a wireless communication apparatus that uses an SC-FDMA method that is an uplink wireless access method; however, the present invention is not limited thereto. For example, the present invention can also be used for another wireless access method other than the SC-FDMA method as long as using a wireless access method that performs a calculation process on discrete Fourier transformation values.

(2) Program

Figure 15:
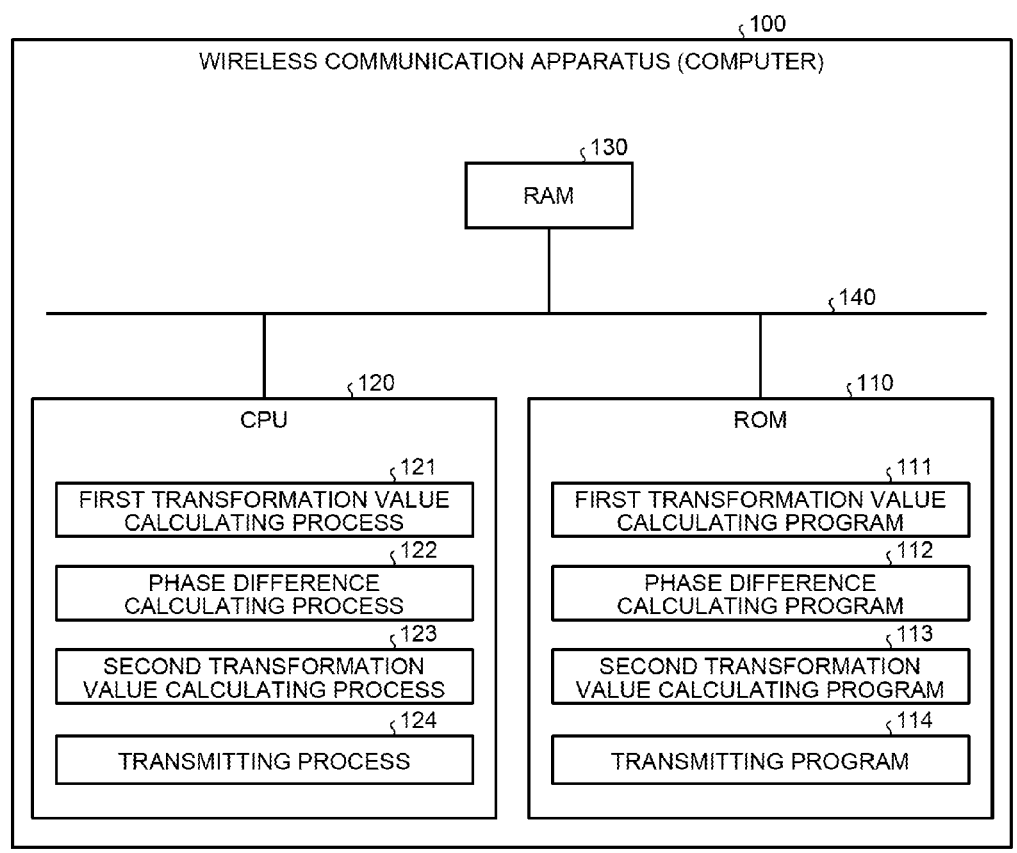
FIG. 15 is a block diagram illustrating a computer that executes a wireless communication program.

The various processes described in the above embodiments can be implemented by programs prepared in advance and executed by a computer. Accordingly, in the following, a computer that executes a program having the same function performed by the apparatus in the above embodiment will be described with reference to FIG. 15. FIG. 15 is a block diagram illustrating a computer that executes a wireless communication program.

As illustrated in FIG. 15, a computer 100 functioning as a wireless communication apparatus includes a ROM 110, a CPU 120, and a RAM 130. The ROM 110, the CPU 120, and the RAM 130 are connected via a bus 140.

The ROM 110 stores therein, in advance, a wireless communication program having the same function as that in the embodiments, i.e., as illustrated in FIG. 15, a first transformation value calculating program 111, a phase difference calculating program 112, a second transformation value calculating program 113, and a transmitting program 114. The programs 111 to 114 are not always stored in the ROM 110.

The CPU 120 reads the programs 111 to 114 from the ROM 110 and executes them. As illustrated in FIG. 15, the programs 111 to 114 function as a first transformation value calculating process 121, a phase difference calculating process 122, a second transformation value calculating process 123, and a transmitting process 124, respectively. The processes 121 to 124 correspond to the first transformation value calculating unit 2, the phase difference calculating unit 3, the second transformation value calculating unit 4, and the transmitting unit 5 illustrated in FIG. 1, respectively.

The communication program described in the embodiment can be implemented by a program prepared in advance and executed by a computer, such as a personal computer or a workstation. The program can be distributed via a network, such as the Internet. Furthermore, the program can be stored in a computer-readable recording medium, such as a hard disc drive, a flexible disk (FD), a compact disc read only memory (CD-ROM), a magneto optical disc (MO), and a digital versatile disc (DVD). Furthermore, the program can also be implemented by a computer reading it from the recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
a processor or a circuit or a combination thereof that performs a process including:
first calculating step, which calculates, from among N transformation values, wherein N is an integer equal to or greater than three, continuous in a frequency domain, only three transformation values continuous in the frequency domain from N data values, by using a discrete Fourier transform equation that is used to transform the N data values continuous in a time domain into the N transformation values continuous in the frequency domain;
an obtaining step, which obtains a change in a phase difference, which is a fixed value, from the only three transformation values calculated at the first calculating step and calculating, on the basis of the obtained change in the phase difference, the phase difference between a calculated transformation value and a not-yet calculated transformation value;
a second calculating, which sequentially calculates the not-yet calculated transformation value by multiplying the calculated transformation value by a twiddle factor that uses the phase difference calculated at the obtaining step as a rotation angle; and
a mapping step, which maps, onto subcarriers, the only three transformation values calculated at the first calculating step and the transformation values calculated at the second calculating step, performing an inverse Fourier transformation process on the mapped transformation values, and transmitting, to a receiving device, the transformation values subjected to the inverse Fourier transformation process.

2. The wireless communication apparatus according to claim 1, wherein
the process further includes a performing step, which performs a cyclic shift on the transformation values calculated at the first calculating step,
the obtaining includes obtaining the change in the phase difference, which is the fixed value, from the transformation values subjected to the cyclic shift performed at the performing step and calculating, on the basis of the obtained change in the phase difference, the phase difference between the calculated transformation value and the not-yet calculated transformation value,
the second calculating step includes calculating, sequentially, the not-yet calculated transformation value by multiplying the calculated transformation value by the twiddle factor that uses the phase difference calculated at the obtaining step as the rotation angle, and
the mapping step includes mapping, onto the subcarriers, the transformation values subjected to the cyclic shift performed at the performing step and the transformation values calculated at the second calculating step, performing the inverse Fourier transformation process on the transformation values mapped onto the subcarriers, and transmitting, to the receiving device, the transformation values subjected to the inverse Fourier transformation process.

3. A wireless communication apparatus comprising:
a processor or a circuit or a combination thereof that performs a process including:
a first calculating step, which calculates, from among N transformation values, wherein N is an integer equal to or greater than three, continuous in a frequency domain, only three transformation values continuous in the frequency domain from N data values, by using a discrete Fourier transform equation that is used to transform the N data values continuous in a time domain into the N transformation values continuous in the frequency domain;
an obtaining step, which obtains a change in a phase difference, which is a fixed value, from the only three transformation values calculated at the first calculating step and calculating, on the basis of the obtained change in the phase difference, the phase difference between a calculated transformation value and a not-yet calculated transformation value;
a second calculating step, which calculates the not-yet calculated transformation value by multiplying the one of the three calculated transformation values by a plurality of twiddle factors each of which uses the phase difference calculated at the obtaining step as a rotation angle; and
a mapping step, which maps, onto subcarriers, the only three transformation values calculated at the first calculating step and the transformation values calculated at the second calculating step, performing an inverse Fourier transformation process on the mapped transformation values, and transmitting, to a receiving device, the transformation values subjected to the inverse Fourier transformation process.

4. The wireless communication apparatus according to claim 3, wherein
the process further includes a performing step, which performs a cyclic shift on the transformation values calculated at the first calculating step,
the obtaining includes obtaining the change in the phase difference, which is a fixed value, from the transformation values subjected to the cyclic shift performed at the performing step and calculating, on the basis of the obtained change in the phase difference, the phase
the second calculating step includes calculating the not-yet calculated transformation value by multiplying the one of the three calculated transformation values by the twiddle factor that uses the phase difference calculated at the obtaining step as the rotation angle, and
the mapping step includes mapping unit maps, onto the subcarriers, the transformation values subjected to the cyclic shift performed at the performing step and the transformation values calculated at the second calculating step, performing the inverse Fourier transformation process on the transformation values mapped onto the subcarriers, and transmitting, to the receiving device, the transformation values subjected to the inverse Fourier transformation process.

5. A wireless communication apparatus comprising:
a memory that stores therein, in association with an arbitrary sequence number, only three continuous transformation values continuous in a frequency domain calculated, from among N transformation values, wherein N is an integer equal to or greater than three, continuous in the frequency domain, by using a discrete Fourier transform equation that is used to transform N data values, continuous in a time domain into the N transformation values continuous in the frequency domain; and
a processor or a circuit or a combination thereof that is coupled to the memory and that performs a process including:

a reading step that reads the only three transformation values stored in the memory in accordance with an input sequence number;

a performing step that performs a cyclic shift on the only three transformation values that are read at the reading step;

an obtaining step, which obtains a change in a phase difference, which is a fixed value, from the only three transformation values subjected to the cyclic shift performed at the performing step and calculating, on the basis of the obtained change in the phase difference, the phase difference between a calculated transformation value and a not-yet calculated transformation value;

a calculating step, which sequentially calculates the not-yet calculated transformation value by multiplying the calculated transformation value by a twiddle factor that uses the phase difference calculated at the obtaining step as a rotation angle; and a mapping step, which maps, onto subcarriers, the only three transformation values subjected to the cyclic shift performed at the performing step and the transformation values calculated at calculating step, performing an inverse Fourier transformation process on the transformation values mapped onto the subcarriers, and transmitting, to a receiving device, the transformation values subjected to the inverse Fourier transformation process.

6. A wireless communication method comprising:

a first calculating step, which calculates, from among N transformation values, wherein N is an integer equal to or greater than three, continuous in a frequency domain, only three transformation values continuous in the frequency domain from N data values by using a discrete Fourier transform equation that is used to transform the N data values continuous in the time domain into the N transformation values continuous in a frequency domain, using a processor or a circuit or a combination thereof;

an obtaining step, which obtains a change in a phase difference, which is a fixed value, from the only three transformation values calculated at the calculating step the only three transformation values and calculating, on the basis of the obtained change in the phase difference, the phase difference between a calculated transformation value and a not-yet calculated transformation value, using the processor or the combination thereof;

a second calculating step, which calculates sequentially the not-yet calculated transformation value by multiplying the calculated transformation value by a twiddle factor that uses the phase difference calculated at the obtaining step the phase difference as a rotation angle, using the processor or the circuit or the combination thereof; and mapping, onto subcarriers, the only three transformation values calculated at the first calculating step the only three transformation values and the transformation values calculated at the second calculating step sequentially the not-yet calculated transformation value, performing an inverse Fourier transformation process on the mapped transformation values, and transmitting, to a receiving device, the transformation values subjected to the inverse Fourier transformation process, using the processor or the circuit or the combination thereof.

* * * * *